(12) United States Patent
Jones et al.

(10) Patent No.: US 7,257,181 B2
(45) Date of Patent: Aug. 14, 2007

(54) METHOD AND APPARATUS FOR CHANNEL EQUALIZATION

(75) Inventors: William W. Jones, Aliso Viejo, CA (US); George A. Zimmerman, Rolling Hills Estates, CA (US)

(73) Assignee: Solarflare Communications, Inc., Irvine, CA (US)

( * ) Notice: Subject to any disclaimer, the term of this patent is extended or adjusted under 35 U.S.C. 154(b) by 0 days.

(21) Appl. No.: 10/852,854

(22) Filed: May 24, 2004

(65) Prior Publication Data

US 2005/0025229 A1 Feb. 3, 2005

Related U.S. Application Data

(63) Continuation-in-part of application No. 10/188,274, filed on Jul. 1, 2002, now Pat. No. 6,961,373.

(51) Int. Cl.
*H04B 1/10* (2006.01)
(52) U.S. Cl. ............... 375/350; 375/231; 375/233; 375/232
(58) Field of Classification Search ........ 375/350, 375/231, 233, 343, 286, 285, 232, 362
See application file for complete search history.

(56) References Cited

U.S. PATENT DOCUMENTS

| | | | |
|---|---|---|---|
| 4,359,778 A * | 11/1982 | Lee ........................... | 375/231 |
| 4,583,235 A | 4/1986 | Dōmer et al. | |
| 4,878,232 A * | 10/1989 | Fisher ...................... | 375/362 |
| 4,956,838 A | 9/1990 | Gilloire et al. | |
| 5,222,084 A | 6/1993 | Takahashi | |
| 5,249,200 A * | 9/1993 | Chen et al. ................ | 375/285 |
| 5,293,402 A * | 3/1994 | Crespo et al. ............. | 375/233 |
| 5,305,307 A | 4/1994 | Chu | |
| 5,388,124 A * | 2/1995 | Laroia et al. .............. | 375/286 |
| 5,633,863 A | 5/1997 | Gysel et al. | |
| 5,646,958 A | 7/1997 | Tsujimoto | |
| 5,856,970 A | 1/1999 | Gee et al. | |
| 5,896,452 A | 4/1999 | Yip et al. | |
| 5,909,466 A * | 6/1999 | Labat et al. ............... | 375/233 |

(Continued)

OTHER PUBLICATIONS

Gerstacker et al. ("Maximum SNR decision-feedback equalization with FIR filters: filter optimization and a signal processing application", 1996 IEEE International Conference on Communication; vol. 2, Jun. 23-27, 1996 pp. 1188-1192).*

(Continued)

*Primary Examiner*—Chieh M. Fan
*Assistant Examiner*—Sudhanshu C. Pathak
(74) *Attorney, Agent, or Firm*—Weide & Miller, Ltd.

(57) ABSTRACT

A method and apparatus is disclosed to overcome the effects of intersymbol interference during data transmission. Overcoming the effects of intersymbol interference makes possible higher data transmission rates for a given error rate. In one embodiment a receiver processing system a first, second and third filter, such that the second and third filter comprise feedback filters. Filter coefficients are calculated to reduce the undesirable effects of the channel, such as intersymbol interference. A training process occurs to establish the first filter as a mixed phase filter and the third filter as minimum phase filter. The second filter is configured based on the transfer function of the channel and one or more coefficients may be set to a predetermined value.

20 Claims, 11 Drawing Sheets

U.S. PATENT DOCUMENTS

| | | | |
|---|---|---|---|
| 6,088,827 | A | 7/2000 | Rao |
| 6,147,979 | A | 11/2000 | Michel et al. |
| 6,160,790 | A | 12/2000 | Bremer |
| 6,167,082 | A * | 12/2000 | Ling et al. .................. 375/233 |
| 6,201,831 | B1 | 3/2001 | Agazzi et al. |
| 6,226,332 | B1 | 5/2001 | Agazzi et al. |
| 6,249,544 | B1 | 6/2001 | Azazzi et al. |
| 6,252,904 | B1 | 6/2001 | Agazzi et al. |
| 6,253,345 | B1 | 6/2001 | Agazzi et al. |
| 6,259,729 | B1 | 7/2001 | Seki |
| 6,272,173 | B1 | 8/2001 | Hatamian |
| 6,285,653 | B1 | 9/2001 | Koeman et al. |
| 6,297,647 | B2 | 10/2001 | Kirk et al. |
| 6,304,598 | B1 | 10/2001 | Agazzi et al. |
| 6,351,531 | B1 | 2/2002 | Tahernezhaadi et al. |
| 6,356,555 | B1 | 3/2002 | Rakib et al. |
| 6,433,558 | B1 | 8/2002 | Sciacero et al. |
| 6,463,041 | B1 | 10/2002 | Agazzi |
| 6,480,532 | B1 | 11/2002 | Vareljian |
| 6,493,448 | B1 | 12/2002 | Mann et al. |
| 6,584,160 | B1 | 6/2003 | Amrany et al. |
| 6,618,480 | B1 | 9/2003 | Polley et al. |
| 6,665,402 | B1 | 12/2003 | Yue et al. |
| 6,751,255 | B1 * | 6/2004 | Reuven et al. .............. 375/233 |
| 6,826,226 | B1 * | 11/2004 | Sahlin et al. ............... 375/232 |
| 6,862,326 | B1 * | 3/2005 | Eran et al. .................. 375/343 |
| 7,110,449 | B2 | 9/2006 | Heo et al. |
| 2001/0036160 | A1 | 11/2001 | Curran |
| 2002/0067824 | A1 | 6/2002 | Wang |
| 2002/0106016 | A1 | 8/2002 | Egelmeers et al. |
| 2002/0176492 | A1 * | 11/2002 | Zangi et al. ................ 375/233 |
| 2002/0191552 | A1 | 12/2002 | Watkinson |
| 2003/0067888 | A1 | 4/2003 | Bina et al. |
| 2004/0001540 | A1 * | 1/2004 | Jones ......................... 375/231 |
| 2004/0125487 | A9 | 7/2004 | Sternad et al. |

OTHER PUBLICATIONS

Oscar Agazzi, et al., "10Gb/s PMD Using PAM-5 Trellis Coded Modulation", Broadcom, *IEEE 802.3*, Albuquerque, New Mexico, Mar. 6-10, 2000, 38 pages.

Jamie E. Kardontchik, "4D Encoding in Level-One's Proposal for 1000BASE-T", Advanced Micro Devices, Aug. 21, 1997—Rev. B, pp. 1-24.

Erich F. Haratsch, et al., "A 1Gb/s Joint Equalizer and Trellis Decoder for 1000BASE-T Gigabit Ethernet", *IEEE Journal of Solid-State Circuits*, vol. 36, No. 3, Mar. 2001, pp. 374-384.

Mehdi Hatamian, et al., "Design Considerations for Gigabit Ethernet 1000Base-T Twisted Pair Tranceivers", *IEEE 1998 Custom Integrated Circuits Conference*, pp. 335-342.

Gottfried Ungerboeck, "Trellis-Coded Modulation with Redundant Signal Sets Part I: Introduction", *IEEE Communications Magazine*, Feb. 1987, vol. 25, No. 2, pp. 5-21.

"Gigabit Ethernet Over Category 5", Copyright 2000-2001 Agilent Technologies, 12 pages.

M.P. Sellers, et al., "Stabilized Precoder for Indoor Radio Communications", *IEEE Communications Letters*, vol. 4, No. 10, Oct. 2000, pp. 315-317.

"WireScope 350—Understanding ELFEXT", © 2000 Agilent Technologies, 2 pages.

David Crawford, "Adaptive Filters", © David Crawford 1996, pp. 1-5.

David A. Johns, et al., "Integrated Circuits for Data Transmission Over Twisted-Pair Channels", *IEEE Journal of Solid-State Circuits*, vol. 32, No. 3, Mar. 1997, pp. 398-406.

Prof. David Johns, University of Toronto, "Equalization", © D.A. Johns, 1997, 29 pages.

David Smalley, "Equalizaiton Concepts: A Tutorial", Texas Instruments, Oct. 1994, pp. 1-29.

Shao-Po Wu, et al., "FIR Filter Design via Spectral Factorization and Convex Optimization", Chapter 1 of *Applied Computational Control, Signal and Communications*, Biswa Datta Editor, Birkhauser, 1977, pp. 1-33.

Richard D. Wesel, et al., "Achievable Rates for Tomlinson-Harashima Precoding", *IEEE Transactions on Information Theory*, vol. 44, No. 2, Mar. 1998, pp. 824-831.

Wolfgang H. Gerstacker, et al., "Blind Equalization Techniques for xDSL Using Channel Coding and Precoding", AEÜ Intl. J. Electr. Commun., May 1999, pp. 1-4.

Chip Fleming, "A Tutorial on Convolutional Coding with Viterbi Decoding", © 1999-2002 Spectrum Applications, pp. 1-6.

"ELFEXT—Introduction", Fluke Networks™, © 2000, pp. 1-2.

"Iowegian's dspGuru FIR FAQ Part 2: Properties", © 1999-2000 Iowegian International Corp., pp. 1-4.

"28.5 Protocol Implementation Conformance Statement (PICS) Proforma for Clause 28, Physical Layer Link Signaling for 10 Mb/s, 100 Mb/s and 1000 Mb/s Auto-Negotiation on Twisted Pair", *IEEE Std 802.3ab- 1999* © 1999 IEEE, pp. 6-14 and 18-44.

M. Tomlinson, "New Automatic Equalizer Employing Modulo Arithmetic", *Electronic Letters*, vol. 7, 1971, pp. 138-139.

Hiroshi Harashima, et al. "Matched- Transmission Technique for Channels With Intersymbol Interference", *IEEE Transactions on Communications*, vol. COM-20, No. 4, Aug. 1972, pp. 774-780.

Peter Kabal, et al., "Partial-Response Signaling", *IEEE Transactions on Communications*, vol. COM-23, No. 9, Sep. 1975, pp. 921-934.

Robert F. H. Fischer, et al., "Dynamics Limited Precoding, Shaping, and Blind Equalization for Fast Digital Transmission Over Twisted Pair Lines", *IEEE Journal on Selected Areas in Communications*, vol. 13, No. 9, Dec. 1995, pp. 1622-1633.

Robert F. Fischer, et al., "Comparison of Precoding Schemes for Digital Subscriber Lines", *IEEE Transactions on Communictions*, vol. 45, No. 3, Mar. 1997, pp. 334-343.

M. Li. S. Wang, et al., "FIR Optimisation as Pre-emphasis of High-Speed Backplane Data Transmission", *Electronic Letters*, 8th Jul. 2004, vol. 40, No. 14, 2 pages.

"Definition of Minium Phase", www-ccrma.stanford.edu/~jos/filters/Definition_Minimum_Phase.html, 3 pages.

\* cited by examiner

METHOD AND APPARATUS FOR CHANNEL EQUALIZATION

PRIORITY CLAIM

This patent application is a continuation-in-part to U.S. patent application Ser. No. 10/188,274, filed Jul. 1, 2002 now U.S. Pat. No. 6,961,373.

FIELD OF THE INVENTION

The invention relates to communication systems and in particular to a method and apparatus for channel equalization.

RELATED ART

Demand for high rate data transmission continues to increase in response to new service offerings and expanded communication network usage, such as for home and business tasks. For example, audio and video content is generally bandwidth intensive. In addition, many tasks are now commonly handled via a computer network, such as over the Internet, including ordering business supplies, exchanging documents, or information gathering. Moreover, bandwidth demand placed upon a companies local area network is increasing. Often networks are being burdened with more users and larger and more complex software applications. These applications are bandwidth intensive and the complex software applications create larger files. Although many networks are currently at bandwidth capacity additional demands are continually being placed on these networks.

While there are numerous proposed solutions to alleviate network congestion by increasing network speeds, many of these proposed solutions involve adoption of a different communication standard or a different communication medium. While different communication standards (SONET, ATM) and different communication mediums (fiber optic cable, coaxial cable) may make it possible to increase data rates, the cost associated with migration is extremely prohibitive. For example, installation of an optical based network, i.e., 10 G Ethernet on fiber or a SONET compatible network, to each computer in a local area network would require significant software and hardware upgrades on each end user's platform. The cost associated with cable installation as well as the retraining of service personnel alone is tremendous.

Another proposed solution is to increase the transmission rate of existing networks. One widely deployed network standard is the version of Ethernet that utilizes twisted pairs of copper wire as its transmission medium. Although widely deployed and inexpensive to manufacture, twisted pair copper is bandwidth limited. As a result, data signals transmitted at very high rates in the gigabit per second range over the twisted pair copper, or other medium, are subject to significant levels of distortion. Upon reception, recovering the transmitted signal may be impossible due to this distortion.

While it is possible to perform signal processing on the distorted signal, or even perform processing on the signal prior to transmission to counter the effects of the distortion, such prior art attempts have been insufficient to achieve very high data transmission rates with acceptable error rates.

For example, certain prior art solutions propose utilizing a decision feedback equalizer (DFE) at the receiver. The DFE may operate in conjunction with a slicer, to determine a voltage level of the signal at a particular sampling time. The slicer output is fed back to the DFE as a feedback signal to aid in subsequent decisions. While the DFE with slicer feedback is capable of decreasing the error rate under certain conditions, it suffers from catastrophic failure when presented with a string of slicer errors as feedback to the DFE. Catastrophic failure is even more likely when error correction is adopted. This is not an acceptable solution and generally will not fall within the specifications set forth by most communication standards.

As a result, there is a need for a method and apparatus capable of overcoming the data rate limiting effects of a channel.

SUMMARY

The method and apparatus described herein overcomes the drawbacks of the prior art by providing a method and apparatus for signal processing to compensate for the effects of signal transmission through a channel. In one embodiment a transmitter is configured to communicate with a receiver via one or more communication channels. The receiver may be configured with a feedforward filter and a feedback filter while the transmitter is configured with a precode filter. Filter operation is controlled by coefficient values. Based on the coefficient calculation process described herein a method and apparatus for filtering is disclosed that overcomes the drawbacks of the prior art. In an example environment of a communication system, the method and apparatus for filtering described herein is utilized for equalization to compensate for the effects of intersymbol interference.

In one embodiment of the invention, a method is provided for filter coefficient selection in a receiver-transmitter pair comprising the following steps. First, training a first filter and a second filter to determine first filter coefficients and second filter coefficients such that the first filter and the second filter have a transfer function inverse to that of a channel, wherein during the training at least one second filter coefficient is forced to a predetermined value. Thereafter, processing the first filter coefficients to isolate minimum phase coefficients and maximum phase coefficients and then transmitting the minimum phase coefficients to a third filter. Next, establishing coefficients of the third filter based on the minimum phase coefficients and setting the first filter coefficients based on the maximum phase coefficients.

In one embodiment, the first filter and the second filter are located in a receiver and the third filter is located in a transmitter. The first filter may comprise a feedforward filter, the second filter may comprise a feedback filter, and the third filter may comprise a precode filter. It is contemplated that the step of transmitting may comprise transmitting the minimum phase coefficients over one or more twisted pair conductors to a precode filter in a transmitter. The processing may comprise performing spectral factorization and forming a polynomial to obtain the minimum phase coefficients and the maximum phase coefficients.

A method for equalizing a signal is also disclosed that comprises receiving a signal transmitted through a communication channel and performing a first equalization process on the signal utilizing a first equalizer having maximum phase coefficient values. Thereafter, performing a second equalization process on the signal utilizing a second equalizer having second equalizer coefficient values wherein the first equalization process and the second equalization process reduce the distorting effects of transmission through the channel.

In one embodiment the first equalizer comprises a feedforward equalizer. Further, at least one of the second equalizer coefficient values may be set to a fixed value during a training stage. The method may further comprise precoding the signal prior to transmission using a precode filter that has coefficients that are based on minimum phase coefficients generated by a training process of the second filter.

In yet another embodiment of performing equalization the first equalizer comprises a feedforward equalizer, the second equalizer comprises a feedback equalizer, and at least one of the first five second equalizer coefficient values are set to zero. Moreover, performing a second equalization process may further include providing a feedback signal to a decision device.

The invention may also be embodied as a system for channel equalization. One such embodiment comprises a first filter configured to utilize one or more first filter coefficients. The first filter may comprise a maximum phase filter. The system also includes 1) a second filter having two or more second filter coefficients wherein at least one of the two or more second filter coefficients are forced to a predetermined value and 2) a precode filter having one or more precode filter coefficients such that the precode filter comprises a minimum phase filter. The first filter and the second filter may be located in a receiver and the precode filter may be located in a transmitter.

In one embodiment the predetermined value comprises zero. The system may further include a processor configured to calculate the first filter coefficients, second filter coefficients and the precode filter coefficients. It is contemplated that the first filter may comprise a feed forward filter and the second filter may comprise a feedback filter. The first filter coefficient values, second filter coefficient values, and precode filter coefficient values may be determined during a training process and one aspect of the training process may comprise spectral factorization.

In yet another embodiment a system is disclosed for exchanging data between a first location and a second location wherein the system comprises a first transceiver comprising a data source interface configured to receive data from a data source, a precode filter configured to equalize the data to at least partially account for transmission through a channel, a digital to analog converter configured to convert the data to a first analog signal, a line driver configured to adjust the power of the first analog signal for transmission over a channel, and a receiver configured to receive data from a second transceiver.

This system may also include a second transceiver with an amplifier configured to receive a second analog signal from the channel such that the second analog signal comprises a distorted version of the first analog signal. The system may also include the following aspects: an analog to digital converter configured to convert the second analog signal to data, a first filter configured to process the data to at least partially reverse the effects of transmission through the channel, a second filter configured to process the data to at least partially reverse the effects of transmission through the channel, a decision device configured to quantize portions of the data into two or more distinct values, and a transmitter configured to transmit precode filter coefficient data to the precode filter in the first transceiver.

In one variation to this embodiment, the precode filter is configured as a minimum phase filter and the first filter is configured as a maximum phase filter. In another variation the second filter comprises a feedback filter having greater than N coefficients and the first N coefficients are set to zero such that N comprises an integer value having magnitude of less than 20. The second transceiver may further comprise a processor configured to calculate coefficients for the precode filter, the first filter, and the second filter.

In another embodiment the method and apparatus disclosed is embodied as a computer program product comprising a computer useable medium having computer program logic recorded thereon for calculating equalizer coefficients. This embodiment comprises computer program code logic configured to perform the following actions: initiate a training sequence, train coefficients of a feedforward filter as a mixed phase filter, train coefficients of a feedback filter, wherein at least one of the coefficients of the feedback filter is set to zero, process the coefficients of the feedforward filter to calculate minimum phase coefficients and maximum phase coefficients, establish the feedforward coefficients based on the maximum phase coefficients, and establish precoder coefficients based on the minimum phase coefficients.

Also contemplated is that the computer program code logic configured to process the coefficients may comprise computer program code logic configured to perform spectral factorization. Furthermore, the process of establishing precoder coefficients based on the minimum phase coefficients may comprise forming a polynomial from the maximum phase feedforward coefficients. It is contemplated that the computer program product may be located in a communication receiver or a transmitter.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1A:
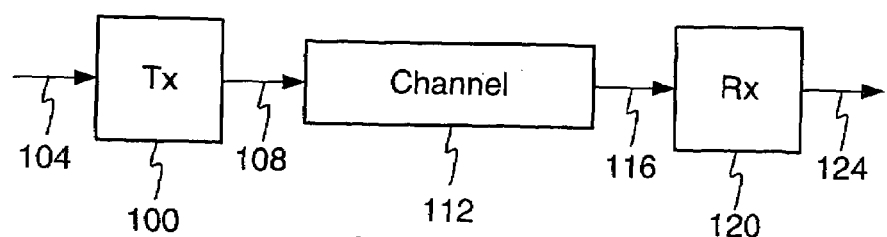
FIG. 1A illustrates a block diagram of an exemplary receiver and transmitter.

FIG. 1A illustrates an example embodiment of a transmitter and a receiver. As shown, a transmitter 100 includes a transmitter input 104 and a transmitter output 108. The output 108 of the transmitter 100 connects to a channel 112. The channel 112 connects to an input 116 of a receiver 120. The receiver 120 includes a receiver output 124. The receiver output 124 may connect to a computing device, terminal, switch, router, network processing device, or any device configured to receive data over the channel 112.

The transmitter 100 may comprise any device configured to transmit data from a first location to a second location. Likewise, the receiver 120 may comprise any device configured to receive data transmitted from the first location to the second location. It is contemplated that a transmitter 100 and receiver 120 may be located at both ends of the channel 112 to enable transmission in both directions. In one embodiment the transmitter 100 and receiver 120 are located in a network interface card in a network terminal, such as a computer configured as part of a local area network.

The channel 112 may comprise any type communication medium capable of transporting data between a first location and a second location. In one embodiment the channel 112 comprises twisted pair copper wire, such as is compatible with data transmission with certain existing Ethernet communication protocols. Any type channel 112 may be utilized with the method and apparatus described herein including but not limited to fiber optic, coaxial, non-twisted metallic conductors, or a wireless medium.

Figure 1B:
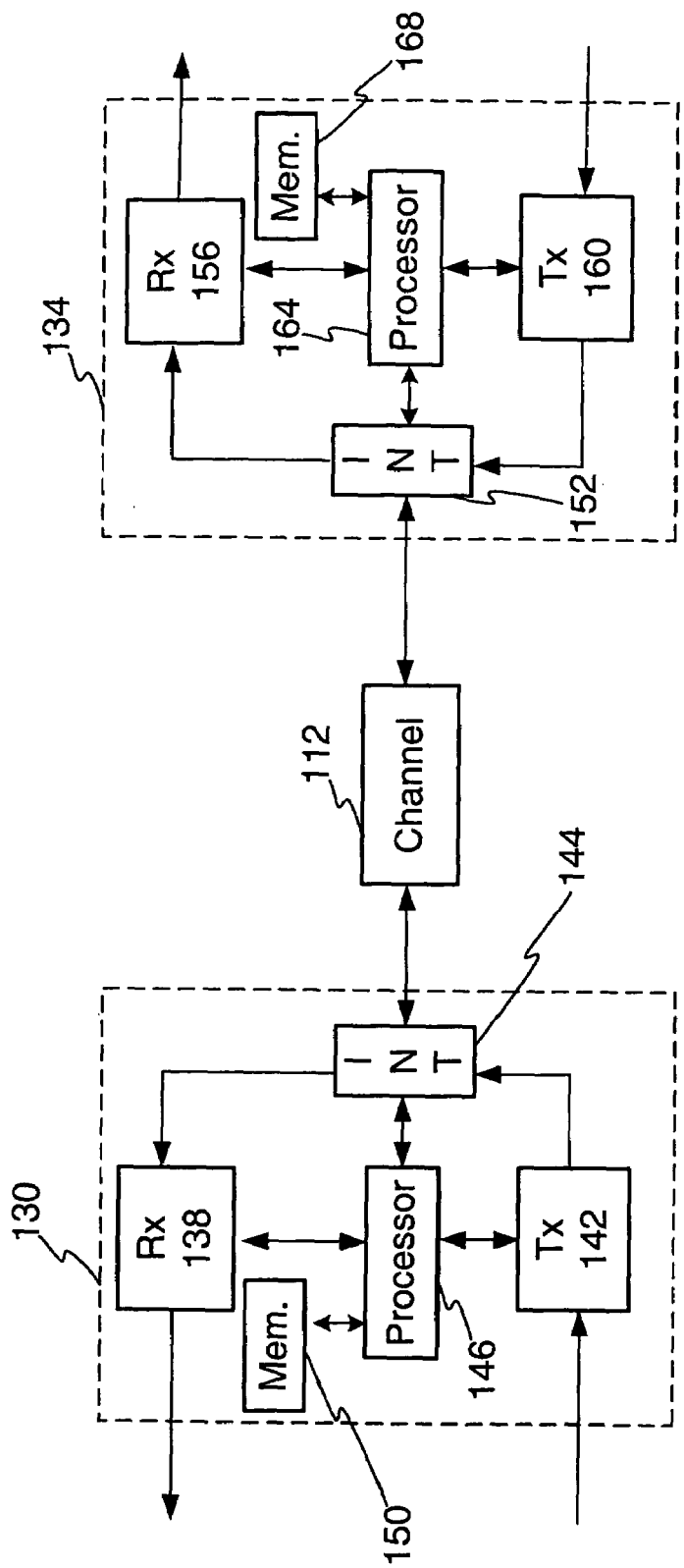
FIG. 1B illustrates a block diagram of an exemplary receiver-transmitter pair.

In reference to FIG. 1B, a block diagram of a receiver/transmitter pair is shown. A channel 112 connects a first transceiver 130 to a second transceiver 134. The first transceiver 130 connects to the channel 112 via an interface 144. The interface 144 is configured to isolate the incoming from outgoing signals. In another embodiment the channel 112 may comprise numerous conductors and hence the interface 144 performs isolation and separates the conductors based on direction of data flow and based on connection to either of a receiver module 138 or a transmitter module 142. The receive module 138 and transmit module 142 may comprise any assembly of hardware, software, or both configured to operate in accordance with the principles described herein.

The receive module 138 and transmit module 142 communicate with a processor 146. The processor 146 may include or communicate with memory 150. The memory 150 may comprise one or more of the following types of memory: RAM, ROM, hard disk drive, flash memory, or EPROM. The processor 146 may be configured to perform one or more calculations or signal analysis. In one embodiment, the processor 146 is configured to execute machine readable code stored on the memory 150. The processor 146 may perform additional signal processing tasks as described below.

The second transceiver 134 is configured similarly to the first transceiver 130. The second transceiver 134 comprises an interface 152 connected to a receiver module 156 and a transmitter module 160. The receiver module 156 and transmitter module 160 communicate with a processor 164, which in turn connects to a memory 168. Operation occurs as described below in more detail.

Figure 2:
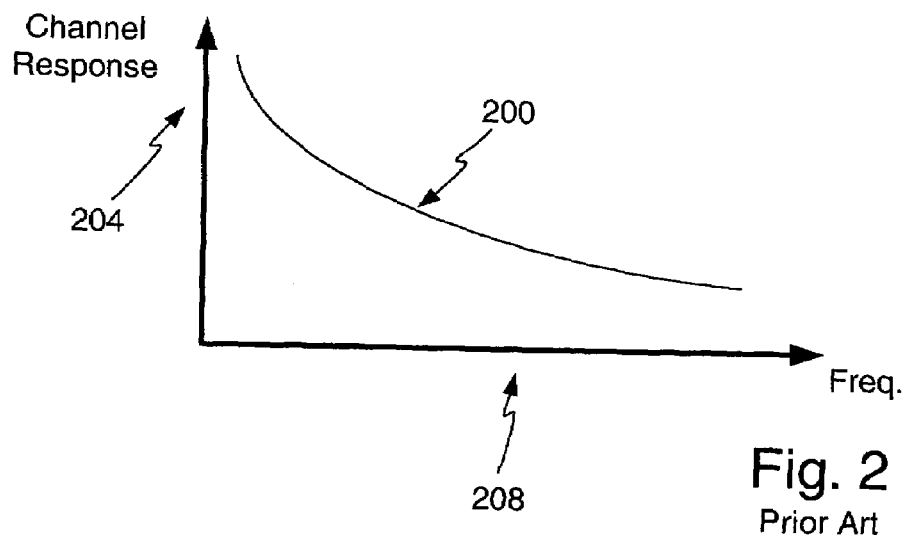
FIG. 2 illustrates an exemplary channel frequency response.

Turning to FIG. 2, an exemplary plot of the frequency response of a channel, such as channel 112 of FIG. 1. A plot of the channel's frequency response 200 is plotted against a vertical axis 204 representing a channel response magnitude while the horizontal axis 208 represents frequency. As can be seen, the channel frequency response is severely attenuated across the available bandwidth.

This will result in a received signal having experienced interference from adjacent pulses. This is often referred to as intersymbol interference or ISI. Intersymbol interference limits the maximum useable bandwidth of a channel by limiting the rate at which pulses, bits, symbols, or signals may be transmitted across the channel. As a result of intersymbol interference, it may be impossible to decode a signal at the receiver, or, if decoding is possible, then an unacceptably high error rate may occur.

The method and apparatus described herein overcomes the bandwidth limiting effects of intersymbol interference thereby allowing greater transmission rates through channels that cause intersymbol interference. While the method and apparatus described herein is capable of operation in numerous different environments and overcoming the signal distorting effects of any type channel, it is particularly well suited to overcome the effects of transmission through twisted pair copper because transmission through twisted pair copper experiences severe intersymbol interference.

Figure 3:
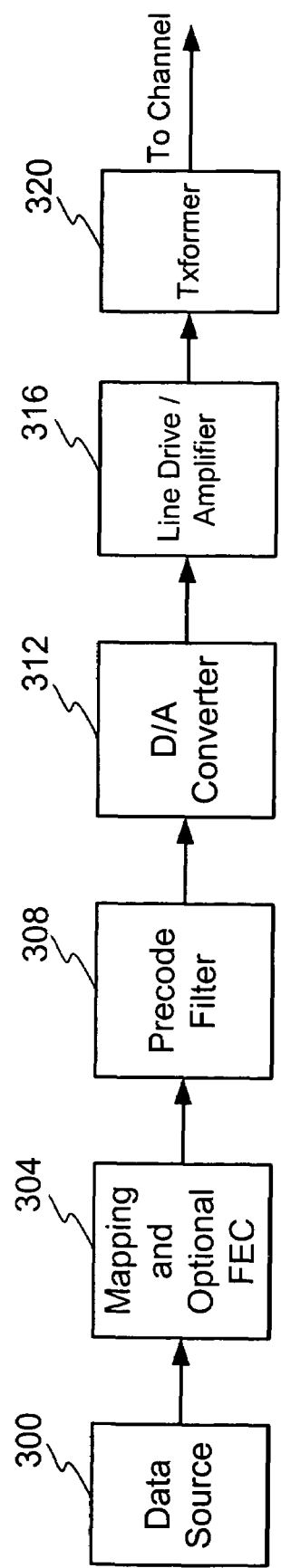
FIG. 3 illustrates an exemplary block diagram of an example embodiment of a transmitter.

In reference to FIG. 3, an exemplary block diagram of an example embodiment of a transmitter is shown. This is but one exemplary embodiment of a transmitter. It is contemplated that other configurations may be embodied by one of ordinary skill in the art. In the exemplary configuration of FIG. 3, a data source 300 connects to a mapping module 304, which in turn connects to a precode filter 308.

The data source 300 may comprise any source of data to be transmitted over a channel. In one embodiment the data source 300 comprises a processing or networking layer of a communication protocol. In one embodiment the data source 300 comprises a network processing device. In one embodiment the data arrives from application software executing on a computer.

The mapping module 304 comprises hardware, software, or a combination of both configured to transform the received binary data into one or more symbols capable or representing one or more bits of binary data. One example mapping that may occur is pulse amplitude modulation (PAM) wherein the several bits of binary data are mapped into a single symbol. Another example of mapping comprises quadrature amplitude modulation (QAM). Through mapping, transmission of a single symbol achieves transmission of several bits of information thereby increasing data transfer rates.

In addition to mapping, the mapping module 304 may incorporate forward error correction (FEC) coding. Examples of FEC coding comprise convolutional coding and trellis coding. It is contemplated that the method and apparatus described herein may be utilized with any form of error correction, or without error correction.

The precode filter 308, which discussed below in greater detail, connects to the output of the mapping module 304 and comprises a signal modification device configured to manipulate the signal to counter the distorting effects of the channel. The precode filter 308 may be configured as a digital filter having coefficient values set to achieve a desired level of signal modification. In one embodiment the precode filter 308 comprises a finite impulse response filter adapted to at least partially negate the distorting effects of a channel. Selection of precode filter coefficients is discussed below in greater detail.

The output of the precode filter 308 connects to a digital to analog (D/A) converter 312 to transform the mapped signal to an analog format. Thereafter, the signal is provided to a line driver/amplifier 316. The line driver/amplifier 316 transforms the signal to a power level suitable for transmission over the channel. The degree or level of amplification may be dependant upon the power limits or specification as defined by a particular communication protocol, crosstalk and coupling concerns, and the distance to a receiver or a repeater. The output of the line driver/amplifier 316 connects to a transformer/hybrid 320. The transformer/hybrid 320 provides isolation between transmit and receive signals as well as the channel itself. The output of the transformer/hybrid 320 connects to a channel.

Figure 4:
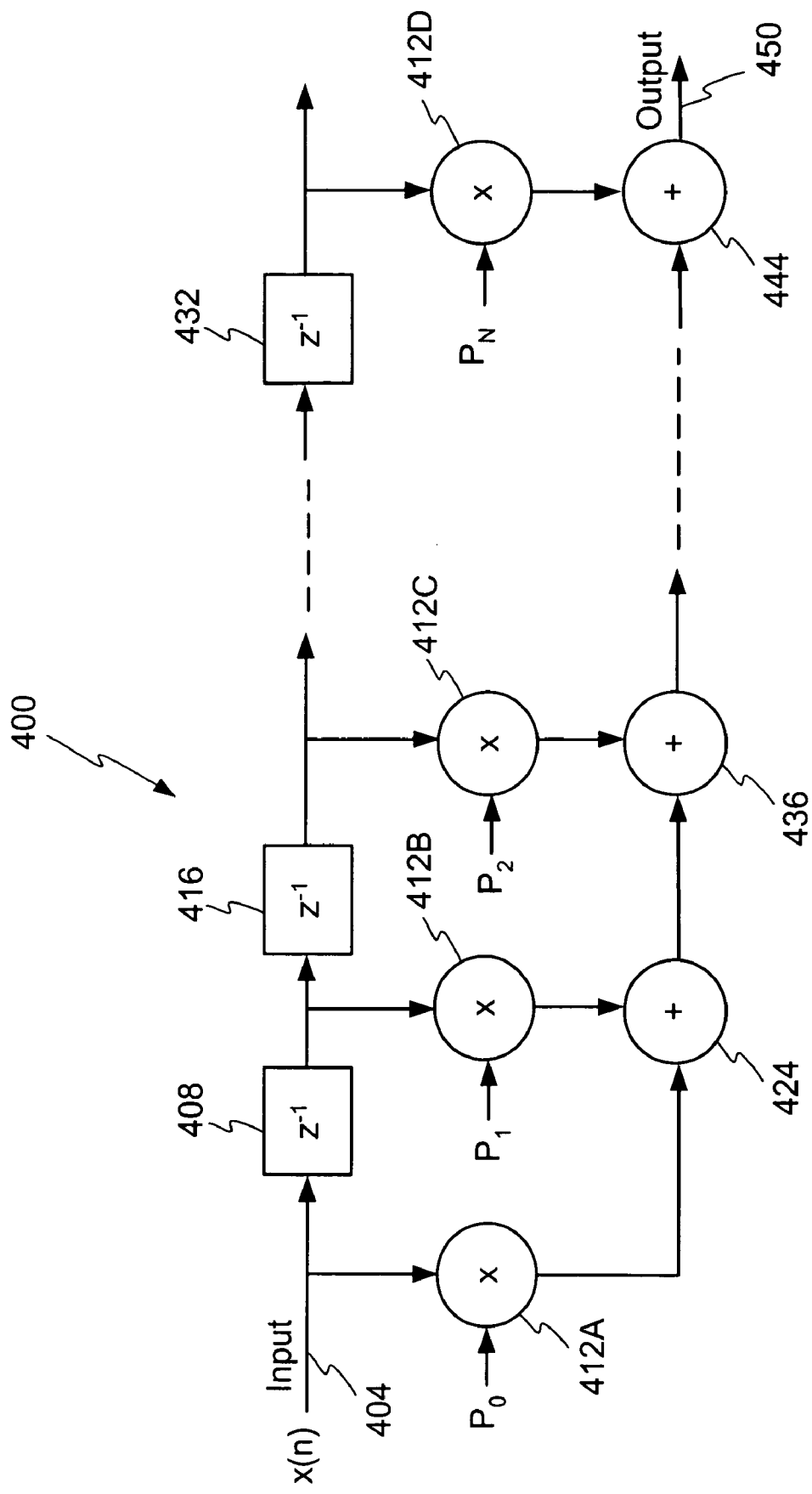
FIG. 4 illustrates a block diagram of an example embodiment of a precode filter embodied as a finite impulse response filter.

FIG. 4 illustrates a block diagram of an example embodiment of a precode filter 400 embodied as a finite impulse response (FIR) filter. As shown in FIG. 4, an input 404 connects to a delay register 408 that is configured to receive and delay for a clock cycle or other period. The input 404 also connects to a multiplier 412A having a multiplier value $P_0$. The output of the multiplier 412A connects to a summing junction 424.

The output of the register 408 connects to multiplier 412B having a multiplier value $P_1$. The output of the multiplier 412B connects to the summing junction 424 to add the output of the multiplier 412B and the multiplier 412A. The output of the register 408 also connects to a register 416, the output of which connects to multiplier 412C. The output of the multiplier 412C connects to the summing junction 436, which also receives the output of summing junction 424. The filter 400 continues in this configuration until connecting to a register 432 that has an output connected to a multiplier 412D with a multiplier factor $P_N$. The output of multiplier 412D connects to a summing junction 444 that also receives the output of the previous summing junction.

This configuration is N+1 long with the elements of the filter controlling the modification or precoding that occurs on the signal. As a signal propagates through the filter 400 it is affected by the multiplier values of the multipliers 412. In one embodiment, the multiplier values may comprise the filter coefficients. Hence, a signal is output from the filter having been modified based on the values of the multipliers 412.

Figure 5:
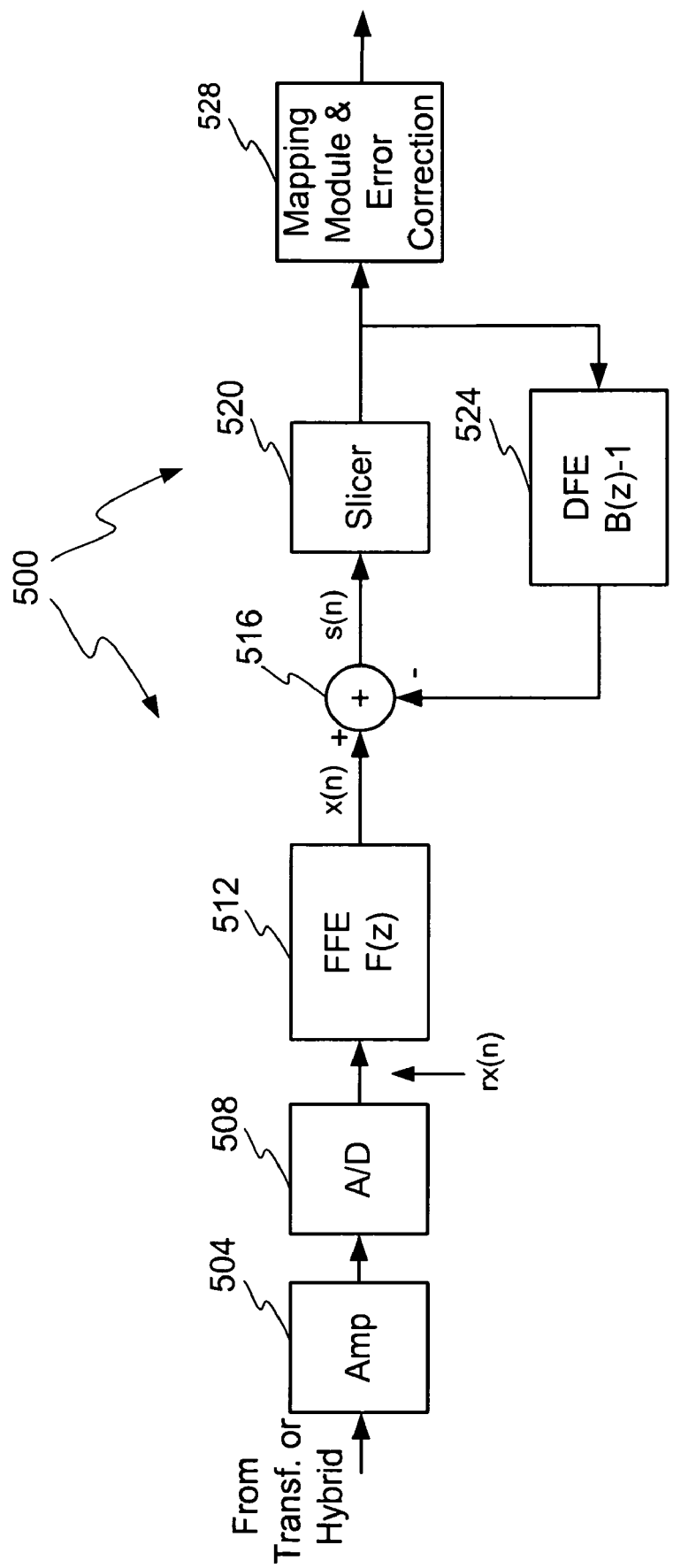
FIG. 5 illustrates a block diagram of an example embodiment of a receiver.

FIG. 5 illustrates a block diagram of an example embodiment of a receiver. This is but one possible receiver configuration. It is contemplated that other receiver configurations may be enabled without departing from the scope of the invention. As shown the receiver 500 comprises an amplifier 504 configured to receive a signal arriving over a channel. The amplifier 504 increases the power level or voltage of the received signal, which may have been attenuated by transmission through the channel. The amplified signal feeds into an analog to digital (A/D) converter 508, which in turn provides a digital signal, rx(n), to a feed forward equalizer (FFE) 512. The output of the FFE, x(n), connects to a summing junction 516. It is contemplated that one of ordinary skill in the art is capable of FFE construction and familiar with basic FFE operation. Accordingly the basic principles of FFE operation are not discussed in detail herein beyond that associated with the new and distinctive features of the invention. It is further contemplated that other filter or equalizer structures, other than an FFE, may be utilized without departing from the scope of the invention.

The summing junction 516 also receives an input from a decision feedback equalizer (DFE) 524. In one embodiment the summing junction subtracts the DFE input from the FFE output. The summing junction 516 provides its output, s(n), to a decision device, such as a slicer 520. The slicer 520 comprises any device capable of analyzing a received signal at particular points in time and quantizing the received signal to two or more distinct values. The slicer 520 may also be referred to as a decision device. In one embodiment, the slicer operates in conjunction with PAM 10 mapping to quantize its input to one of 10 values. In one embodiment the slicer 520 analyzes the received signal's voltage level, after processing, to determine the symbol sent over the channel. The output of the slicer 520 may comprise binary data or mapped voltage levels.

The slicer 520 provides it output to a de-mapping module 528 and as an input signal to the DFE 524. If the transmitter performed error correction encoding on the signal prior to transmission, then the de-mapping module 528 may perform error correction decoding on the received signal to decrease the bit error rate. The error correction processing, as part of the forward error correction, reduces the effective error rate of the data signal. Forward error correction may occur on binary data or symbols.

It is contemplated that one of ordinary skill in the art is capable of DFE 524 construction and familiar with basic DFE operation. Accordingly the basic principles of DFE operation are not discussed in great detail herein beyond that associated with the new and distinctive features of the invention. It is further contemplated that other filter or equalizer structures, other than an FFE 512 or DFE 524 may be utilized without departing from the scope of the invention.

The FFE 512 and the DFE 524 perform equalization on the received signal to compensate for the distorting effects of the channel. The DFE 524, as part of the feedback, receives and weights past values, which are subsequently subtracted, in the summing junction 516, from the arriving signal. It is contemplated that the FFE 512 and DFE 524 may possess coefficients, or other scaling values, associated with one or more taps or stages of the FFE and the DFE. The coefficient values are selected to achieve desired signal equalization to thereby negate, reverse, or reduce the effects of the channel. In one embodiment the FFE 512 and DFE 524 coefficient value are selected based on the principles described herein.

As an advantage of the method and apparatus described herein the coefficient values of the FFE 512, DFE 524, and the precode filter (element 308, FIG. 3) are calculated and selected to counter the signal distorting effects of the channel while minimizing noise amplification and minimizing the undesirable effects of error propagation through the DFE feedback loop. Through these desirable properties data communication is enabled at rates here before unattainable over certain channels and utilizing the components described herein. Moreover, complexity of all system components is capable of being realized with existing integrated circuit processes and construction. Similarly, the complexity of the processing is capable of being performed within time limits available during high speed data communication.

A discussion regarding coefficient calculation is now provided. It should be noted that although specified as particular filter configurations for purposes of discussion, it is contemplated that any type filter or signal modification device may replace the DFE, the FFE, or the precode filter.

Figure 6A:
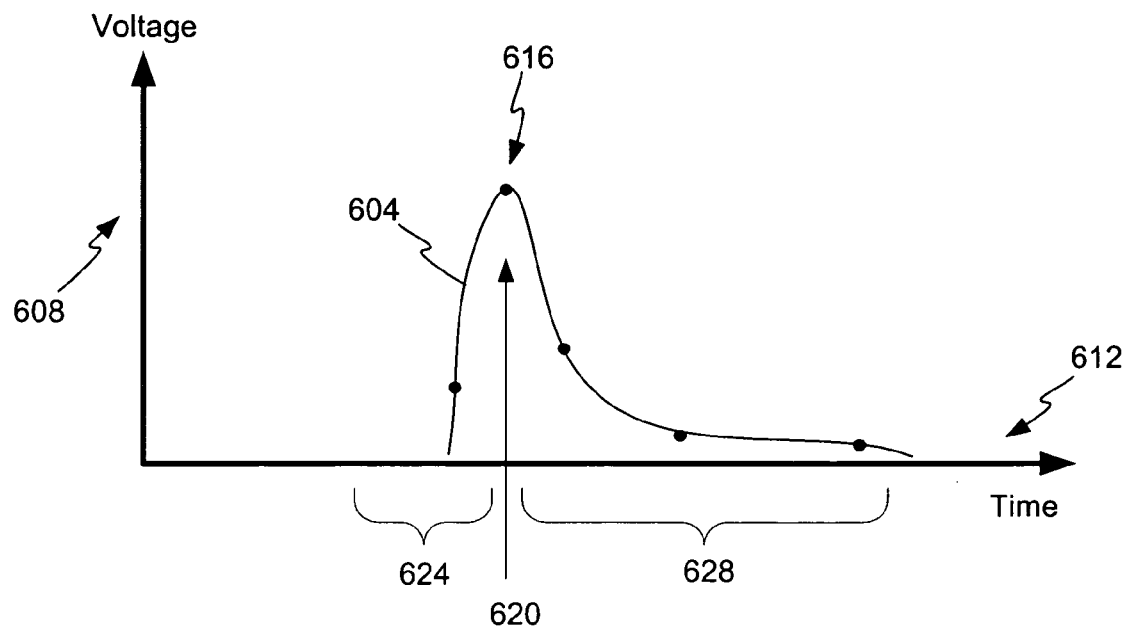
FIG. 6A illustrates an exemplary plot of a received signal pulse.

FIG. 6A illustrates an exemplary plot of an exemplary received pulse. The received signal is the superposition of many pulses scaled by the data symbol. As shown, a received pulse 604 is shown as a function of voltage represented on a vertical axis 608 and time on a horizontal axis 612. A main cursor 620 identifies a sampling point 616. The sampling point may be considered the point at which a slicer determines the values of the data symbols. Sample points arriving prior to the main cursor 620 are defined as pre-cursor points 624 while sample points arriving after the main cursor are defined as post-cursor points 628. In one embodiment, DFE operation is directed primarily to post-cursor intersymbol interference mitigation while the FFE operation is directed to pre-cursor intersymbol interference mitigation. In one embodiment it is desired to achieve FFE operation such that a pulse, received through the channel and after processing by the FFE would be monic and minimum phase, i.e. all the pre-cursor information is eliminated.

Figure 6B:
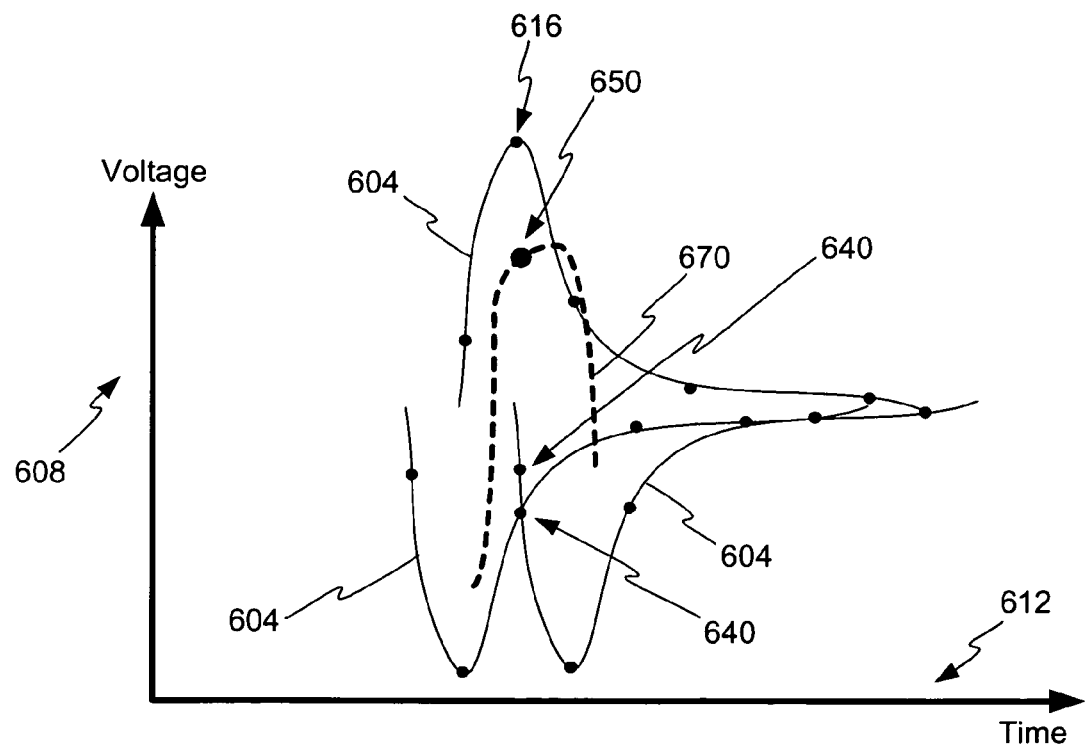
FIG. 6B illustrates an exemplary plot of a received signal containing intersymbol interference components.

FIG. 6B illustrates an exemplary plot of an exemplary received signal 670 with intersymbol interference. As compared to FIG. 6A, like elements are labeled with identical reference numerals. For purposes of discussion, intersymbol interference signal samples 640 are shown in addition to the desired signal sample 616. It is contemplated that the intersymbol interference signal samples 640 may interfere, due to channel distortion, with the desired signal samples 616 to produce a sample 650 of the received signal 670. As can be understood, the desired sample 616 will combine with the interference samples 640 to create a signal having a reduced magnitude 650. While an extreme example, it can be understood that in the absence of channel equalization, the slicer, when presented with the reduced voltage magnitude 650, will result in an incorrect decision. This creates a symbol error and is particularly troublesome because, in certain mapping schemes, each symbol can equate to many binary bits. The method and apparatus described herein achieves equalization and overcomes these drawbacks.

By way of introduction and referring to FIG. 5, a receiver output, prior to equalization, can be defined by the convolution;

$$r_x(n) = \sum_{h=-K_1}^{K_2} C_h d_{n-h} = C(n) \otimes d(n)$$

which can be expanded to;

$$r_x(n) = C_{-K_1} d_{n+K_1} + \ldots + C_0 d_n + \ldots + C_{K_2} d_{n-K_2}$$

where the value $C_0 d_n$ represent the main cursor and the terms prior to $C_0 d_n$ represent pre-cursor terms while the terms after $C_0 d_n$ represent post-cursor terms. The variable C represents the coefficients of the equivalent channel, d represents data symbols and the variable n represents a sampling time. Accordingly, n is the current sampling time while n−1 represents a previous sampling time.

Similarly, the FFE output may be represented as;

$$x(n) = f(n) \oplus r(n)$$

and this representation may be expanded as;

$$x(n) = d_n + C'_1 d_{n-1} + \ldots + C'_{K_3} d_{n-K_3}$$

As can be seen, the FFE is configured to eliminate the pre-cursor terms while the main cursor and $K_3$ post-cursor terms remain. Stated another way, the main cursor $d_n$ and the terms to the right of the main cursor are left to form the output of the FFE.

If the DFE coefficients are chosen to be $\{b_n\}$, then the slicer input can be defined as;

$$s(n) = x(n) - b_1 \hat{d}_{n-1} - \ldots - b_{K_4} \hat{d}_{n-K_4}$$

where $\hat{d}$ is an estimate and may be equal to d.

Thus for correctly fedback symbol decisions when $\hat{d}$ equals d, then;

$$s(n) = d(n)$$

provided $K_4$ is greater than or equal to $K_3$ and $$b_k = \begin{cases} C'_k & k = 1 \ldots K_3 \\ 0 & \text{otherwise} \end{cases}$$

when $K_4$ is less than $K_3$, there will be some residual uncancelled post cursor ISI. These equations may be considered to define the signals and their processing within the receiver.

As discussed above, if incorrect decisions are made by the slicer, these incorrect decisions are fed back into the DFE and error propagation occurs. As a result of the feedback, the errors may build upon themselves. In embodiments having forward error correction processing subsequent to the DFE, this error propagation may result in long strings of errors being presented to the forward error correction processing. The problems are compounded since the slicer operates without the coding gain provided by the forward error correction. Hence the slicer error rate is higher thereby increasing the likelihood of error propagation. Consequently, the communication session must be closed and restarted. This is generally undesirable.

In one embodiment of the method and apparatus described herein, coefficients are selected to overcome the drawbacks of the prior art based on a partial precoding method. In summary, precoding occurs for only a limited number of post-cursors and FFE processing and DFE processing also occurs at the receiver. Selection or calculation of the coefficients for the precoder, FFE, and DFE occur as described below. Based on the coefficient selection and the inclusion of a precoder, FFE, and DFE the pre and post cursor intersymbol interference is eliminated or reduced and error propagation is reduced to an acceptable level or eliminated. Moreover, the peak to average (PAR) value of the signal presented to the receiver is within acceptable limits and error propagation is minimized or eliminated.

As described above, the FFE may be represented as the coefficients of a polynomial. Thus, the polynomial may be represented as;

$$F(z) = f_0 + f_1 z^{-1} + \ldots + f_K z^{-K}$$

which may be factored in product form as;

$$F(z) = \prod_{k=1}^{K} (1 - r_k z^{-1}) = (1 - r_1 z^{-1})(1 - r_2 z^{-1}) \ldots (1 - r_K z^{-1})$$

where r is a function of the f values and are the roots of the polynomial. In an expanded form this may be considered a $K^{th}$ order polynomial. It should be further understood that this resulting $K^{th}$ order polynomial may be factored into the minimum phase roots and the maximum phase roots. The minimum phase roots are defined as all roots where the absolute value of $r_k<1$ for all k and the maximum phase roots are defined as all roots where the absolute value of $r_k>1$ for all k. The case with equality to one can not occur in practice with channels having finite frequency responses. In general, a trained FFE is a maximum phase type system. In general, a trained DFE tends to be minimum phase. It follows that mixed phase systems include root values that have magnitude both greater than and less than 1. Working from this understanding regarding a trained FFE filter, the discussion of a method of training, as contemplated by the invention, may occur.

Figure 7:
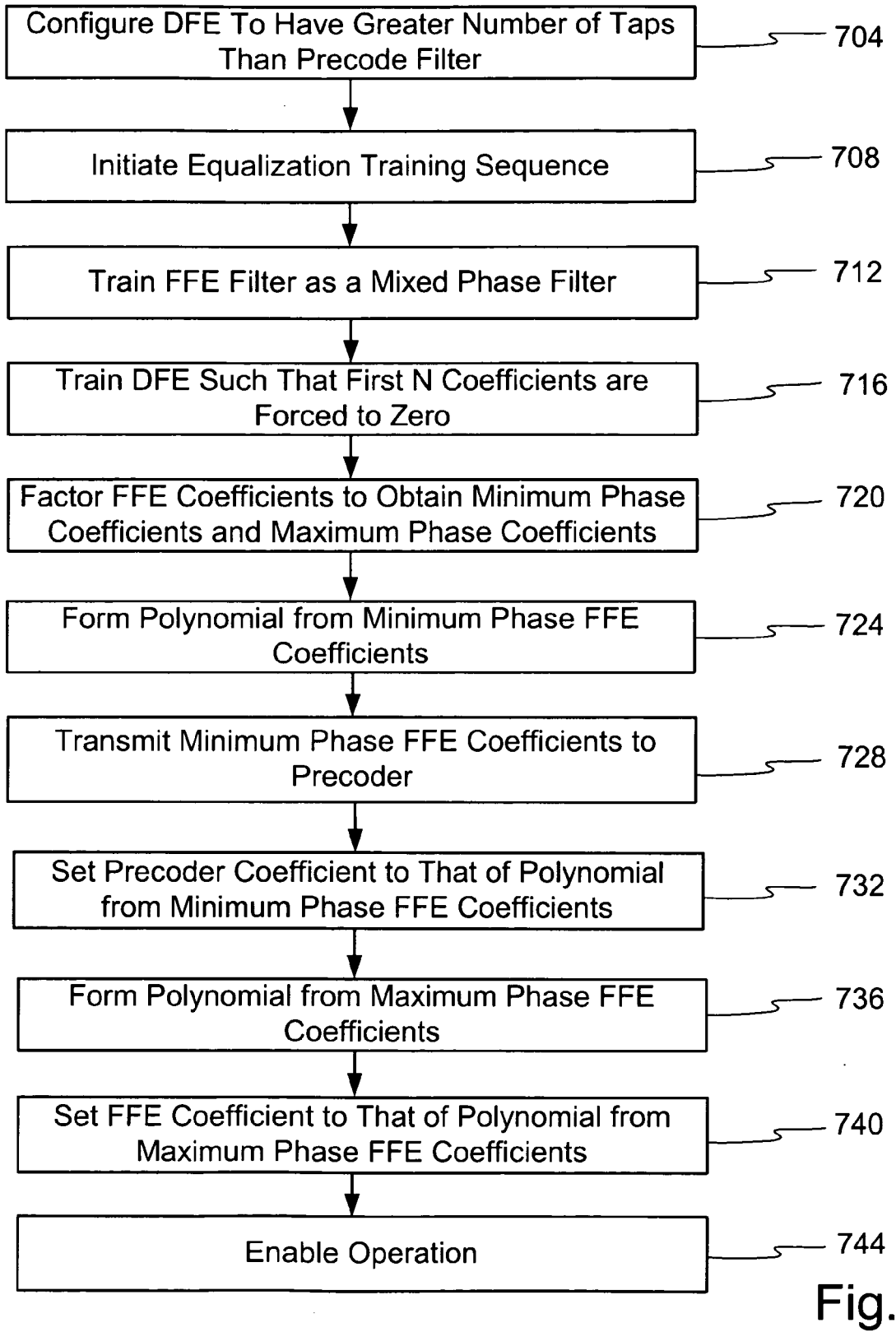
FIG. 7 illustrates an operational flow diagram of an example method of operation.

Next, to achieve the benefits of the equalization and precoding described herein, reference is made to FIG. 7. FIG. 7 illustrates an operational flow diagram of an exemplary method of operation. In general the method described herein performs training and processing to establish precoder coefficients and equalizer coefficients for the FFE and the DFE. As a result, the precoder in the transmitter operates to reduce or eliminate the part of post-cursor interference which contributes most to error propagation while the FFE in the receiver operates to reduce or eliminate pre-cursor interference. The DFE in the receiver operates to eliminate residual post cursor interference. In one embodiment the length, i.e. the number of taps, and hence number of coefficients of the DFE is made to be greater than the number of coefficients in the precoder given by N+1. Thus, at a step 704 the DFE is configured with more taps than an associated precode filter. Hence there is a greater number of taps in the DFE than the number of post-cursors that are to be precoded by the precode filter.

It should also be noted that the initial coefficient values in a DFE have the largest influence on the DFE. Hence, the first N DFE taps are considered to have the greatest effect on the operation of the DFE output. Hence an error by the slicer that is fed back to the DFE when the first N coefficients of the DFE are set to zero is less likely to propagate additional errors than a DFE with the first N coefficients set to non-zero values. Thus, setting the first N coefficients of the DFE to zero reduces the likelihood of additional errors in subsequent decisions by a slicer. The use of the precoder to effect the first N taps of the DFE filter is discussed below in more detail.

Next, at a step 708, a training process is initiated. Training comprises a process of filter coefficient calculation. In one embodiment the training occurs each time the receiver or transmitter is energized or activated. In another embodiment training occurs during design of the system and the filter coefficients are hardcoded. At a step 712, the FFE is trained as a mixed phase filter and not as the typical maximum phase filter. Stated another way, a training event occurs whereby the coefficients of the taps of the FFE are determined. As a parameter, the FFE is configured to include both minimum and maximum phase terms, and hence it is mixed phase. It is contemplated that the training may comprise real time operation that occurs when a communication begins as part of an exchange of data between a transmitter and a receiver. A known or predetermined sequence may be utilized or a random or pseudorandom sequence may be utilized, such as would be required in the least mean square (LMS) algorithm for coefficient determination.

It is further contemplated that an assumption may be made that all devices will encounter a known channel. If such an assumption is made, then an estimate of an exemplary channel may be arrived at during a design state of the system and the equalizer system may be hardcoded or hardwired with these predetermined values. In such an embodiment the training process would not occur every time a communication session begins, but instead during device design or manufacture. Training may be achieved using hardware or software systems or a combination thereof. Processor or machine executable code may be stored in a memory and executed on a processor to determine the coefficient values. Hard coded logic, delays, summing junctions, multipliers or any other hardware may be utilized for training. It is contemplated that the method described herein may occur using computer program product comprising a computer useable medium having computer program logic recorded thereon, or hardware, or a combination of both.

Concurrently or thereafter at a step 716, the DFE is trained such that the first N coefficients are forced to zero while the tail may assume non-zero values. The tail is defined as filter coefficient values other than the first N. In one embodiment, the first N coefficient values are set to zero prior to training, and thereafter training occurs. In one embodiment this comprises executing any training processes, such as that described above to determine FFE coefficient values while concurrently setting the first N coefficients to a predetermined value. It is contemplated that in other embodiments the first N coefficients maybe set to a predetermined value other than zero. In one embodiment the FFE and DFE are trained simultaneously.

The term N represents an arbitrary number selected based on the particular design parameters and desired filter/equalizer complexity. In one embodiment N is selected such that the value N is sufficient to reduce or eliminate catastrophic failure as a result of feedback of errors to the slicer. By setting the first N coefficients of the DFE to zero, the significance of the DFE in signal equalization is reduced and hence the chance of error propagation is reduced. In one embodiment N is set to 4. In other embodiments the value of N may range from 1 to 50.

To account for the first N coefficients being set to zero or some other predetermined value, the method and apparatus implements a precoder, having responsibility for precoding (equalizing) the effects of the first N post cursors that would have otherwise been equalized by the DFE. Further, there need not be a one-to-one correspondence between the number of DFE coefficients that are forced to zero and the level of precoding.

As a result of the first N coefficients of the DFE being set to zero during training and the FFE filter being concurrently trained, the main tap of the FFE filter is adjusted or shifted by N cursor positions. Stated another way and in the exemplary case of a tap delay line configuration, the main cursor location is not the last tap, but N taps preceding the last tap.

At this stage in the initial coefficient calculation process, precoding is not present and due to the first N DFE coefficients being set to zero, the FFE training results in FFE coefficients values that account for both post cursor interference and pre-cursor interference. Hence the FFE is a mixed phase filter. Absent further equalization or coefficient adjustment, such as by use of a precode filter, the system, and in particular the FFE would undesirably enhance noise. This occurs because a mixed phase FFE enhances noise.

To overcome the noise enhancement effect, the method performs spectral factorization on the coefficients of the trained FFE. This occurs at step 720. The roots of the mixed phase FFE (F') may be represented as:

$$F'(z) = \prod_{k=1}^{K}(1 - r'_k z^{-1}) = (1 - r'_1 z^{-1})(1 - r'_2 z^{-1}) \ldots (1 - r'_K z^{-1})$$

From this equation, the roots are represented by the variable $r'_k$. As part of step 720 processing occurs to identify all the $r'_k$ values having magnitude of less than one. These are defined as the minimum phase roots. Any root finding algorithm maybe used to find the roots. The algorithm may be implemented in hardware, software or some combination of both. Step 720 also comprises identifying all the $r_k$ values that have magnitude greater than 1. These are defined as the maximum phase roots.

For the minimum phase roots, P(z), representing the transmitter precoder function, may be represented in factored form;

$$P(z) = \prod_{k=\min\, phase}(1 - r'_k z^{-1})$$

which may be expanded into a polynomial in z, at step 724, as shown below, where {p} equals a coefficient value and $z^{-1}$ represents the unit of delay in a tap delay line filter.

$$P(z) = p_0 + p_1 Z^{-1} + \ldots + p_N Z^{-N}$$

This set of coefficient values {p} are, at a step 728, communicated back to the transmitter associated with the receiver. Then at a step 732, these coefficient values become the precoder coefficient values for the precoder located in the transmitter.

In summary of steps 720-732, the FFE coefficients, determined by training at step 712, are subject to spectral factorization and the minimum phase roots are identified and formed into a polynomial. The coefficients of this polynomial are transmitted to the precode filter and serve as the precoder coefficient values. Hence, the precoder filter coefficients are established.

Next or concurrently, it is desired to determine the final FFE coefficients. At previous step 720, spectral factorization was performed on the trained FFE coefficients. In contrast to identifying the minimum phase roots, which were used to determine the precoder filter coefficients, the operation now identifies the maximum phase roots, i.e. the roots having magnitude greater than 1 for all k values. Any root finding algorithm maybe used to find the roots. The algorithm may be implemented as either hardware, software or some combination of both. These roots may be represented as;

$$F(z) = \prod_{k=\max\, phase}(1 - r'_k z^{-1})$$

which may be expanded into a polynomial in z, at step 736, as shown below, where f represents a coefficient value and $z^{-1}$ represents a unit of delay in the tap delay line filter.

$$F(z) = f_0 + f_1 z^{-1} + \ldots + f_M z^{-M}$$

F'(z) (non-factored) differs from F(z) (factored and non-prime) in that F'(z) is a mixed phase filter which has yet to undergo spectral factorization while F(z) represent the FFE filter configured with the maximum phase roots of the factored polynomial resulting from the factorization of the coefficients of F'(z).

At a step 740, the coefficients of this polynomial become the coefficients of the FFE filter in the receiver. The trained FFE coefficients from step 712 are thus replaced by the coefficients of the polynomial derived from the maximum phase roots after spectral factorization. Thereafter, at a step 744, communication using the receiver and transmitter pair may be enabled.

Hence, in summary of one embodiment, the DFE coefficients and FFE coefficients are determined during the training process described above in conjunction with steps 712 and 716, with the first N coefficient values of the DFE set to zero or some other value. The precoder coefficients are determined to be the minimum phase roots of the factored polynomial derived from the trained FFE coefficients. This occurs at step 732. Finally, the FFE coefficients are set as the maximum phase roots of the factored polynomial derived from the trained FFE. This occurs at step 740.

One advantage of the method and apparatus described herein is that in one embodiment or variation the DFE or other filter may be made to adapt during operation in data mode. Data mode is defined to mean a time period when the transmitter/receiver pair operates to transmit data, such as data from a data source. Data mode is in contrast to training mode, handshake mode or start-up. Adaptation of the filter coefficients during data mode allows the filter to deal with, i.e. adapt, to changes in the channel that may occur over time. While it is assumed during the initial training process that the coefficients accurately equalize the channel, the values resulting from the initial training may be slightly incorrect or the channel transfer function may change over time. For DFE adaptation during data mode, the first N coefficients may be maintained at zero and the remaining coefficients are adapted in real time during data mode. In another embodiment one or more of the first N coefficients may be modified. For FFE adaptation during data mode, the coefficients are adapted in real time. Alternatively, the FFE could be trained as a mixed phase filter to compensate for the fixed precoder which, in some embodiments, may not easily be adapted during data mode. It is contemplated that the precoder could be adapted during data mode via a side channel or in any other manner.

Another advantage of the method and apparatus described herein is evident in comparison to Tomlinson-Harashima type precoding (TH precoding). TH preceding teaches away from the approach described herein by eliminating the DFE. TH precoding eliminates the use of the DFE in the receiver thereby eliminating any possibility of error propagation. However, TH preceding suffers from the disadvantages of lacking data mode adaptation. Lack of adaptation during data mode, results in a less effective equalizer because of the inability to adapt to changing channel conditions.

Further TH precoding results in a transmitted signal having a large received PAR value. PAR is defined as peak to average value of a signal. A large PAR value results in a more challenging and expensive analog front end at the receiver. As a result of a large PAR value of a received signal, the analog to digital converter at the receiver may require more converter bits than with a signal having a smaller PAR value. This requirement limits the sampling rate of the converter and as a result limits its use in high speed applications. With the method and apparatus described herein, the received signal possesses a desirable, i.e. lower, PAR value.

ALTERNATIVE EMBODIMENTS

In an alternative embodiment, the FFE may be configured, during steps 736, 740, as a mixed phase system. To achieve a mixed phase FFE, step 712 and 716 would occur by training the FFE and DFE. Thereafter, in accordance with step 720, the system factors the roots of the polynomial formed from the FFE coefficients and the precoder filter coefficients are set. Instead of using the maximum phase roots of F'(z) as the final FFE coefficients as contemplated by step 736, the operation, either during data mode or during training, may re-train the FFE and DFE with the precode filter in the loop, i.e. operating. In one embodiment, the first N coefficient would be forced to zero during this re-training process. As a result, the FFE will become a mixed phase system. Although the FFE may introduce a minimal amount of noise enhancement, this embodiment reduces the complexity of the system and the training process while still providing desirable equalization and reducing error propagation. This embodiment also compensates for any inaccuracies that may occur during the estimation of the precoder coefficients.

In another alternative embodiment, the FFE coefficients may be left as was determined at step 712, but appended with zeros (or some other value) to reduce the noise enhancement. Since, the partial ISI components that generate the postcursor components are being dealt with at the transmitter, it is possible to set the coefficients of the FFE that would otherwise equalize the pre-cursor components of the received signal to zero or some other value. Because one or more of these coefficients are set to zero or some other small value, the noise enhancement is reduced or eliminated. This reduces the complexity of the system and the training process while providing the equalization advantages discussed above.

It is further contemplated that some communication systems that operate at high transmit rates may be configured with a decision feedback structure, such as the DFE filter 524 shown in FIG. 5 and described above. In numerous applications this structure performs as desired and described above. One potential drawback in the use of a DFE structure, as is set forth in the background, is error propagation through the DFE feedback structure, which may result in catastrophic failure of the communication session. To overcome error propagation risks, the discussion provided in connection with FIGS. 1-7 disclosed methods and apparatus for overcoming error propagation and mitigating intersysmbol interference (ISI) and other types of unwanted noise. Such methods and apparatus comprise use of a precode filter as described.

In addition to the beneficial processing described in connection with FIGS. 1-7, it is further contemplated that one or more alternative embodiments and methods may be utilized to mitigate ISI, error propagation and improve analog front-end linearity and bandwidth. These alternative embodiments, which will now be described, may be better suited for certain environments as compared to the prior embodiments and, as such, have advantages over these other embodiments. These advantages are discussed below in more detail.

Figure 8:
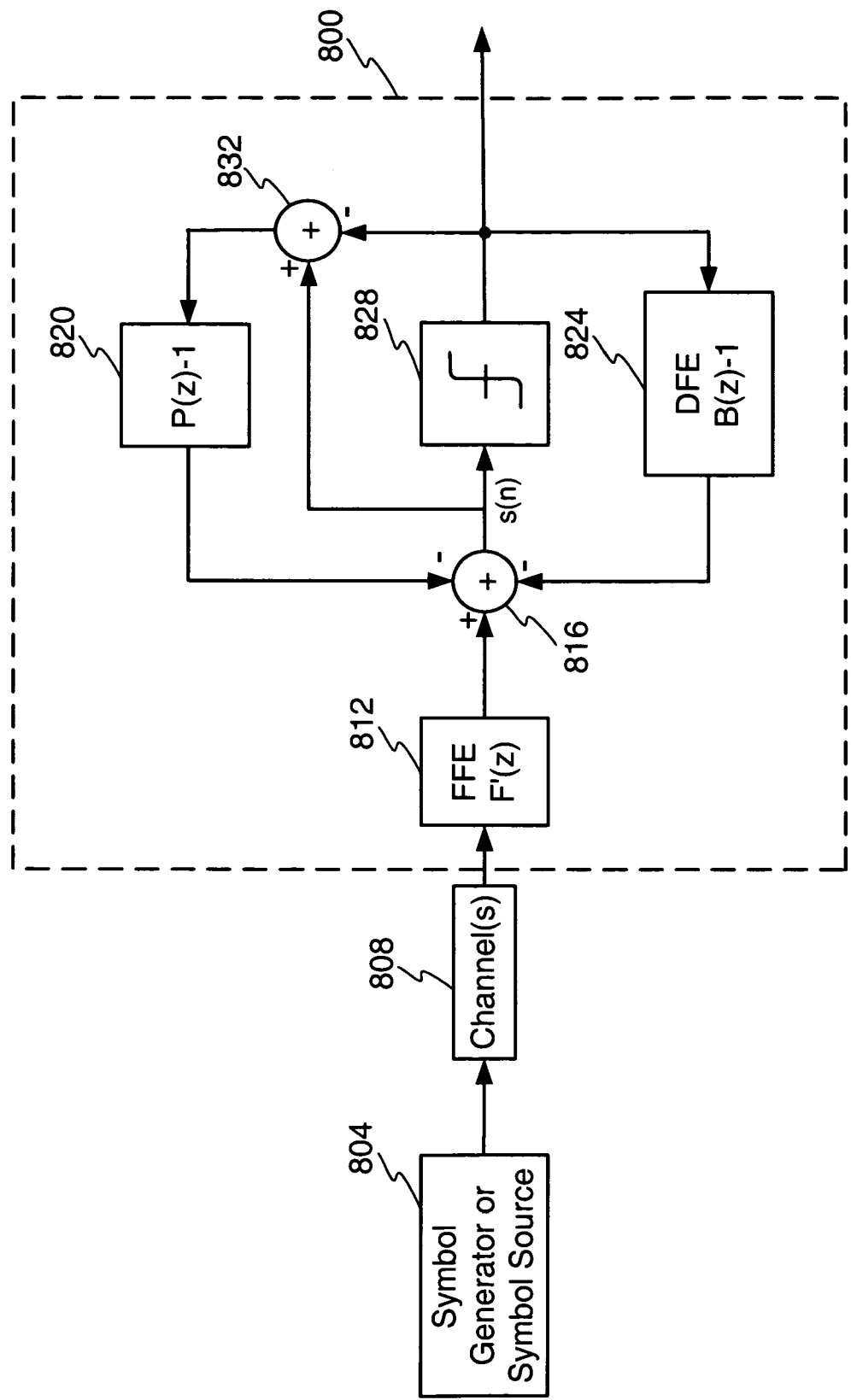
FIG. 8 illustrates a block diagram of an example embodiment of an apparatus for channel equalization with three filters located at the receiver.

FIG. 8 illustrates a block diagram of an example embodiment of a receiver based signal processing system. This is but one possible embodiment of a receiver based processing system and, as such, it is contemplated that other embodiments may be arrived at by one of ordinary skill in the art, without departing from the scope of the claims that follow. In contrast to the embodiment shown in FIG. 3 and FIG. 5, the embodiment of FIG. 8, and the communication system, such as a transmitter from which it would receive a signal, does not utilize precoding. As a result, this system may be referred to as receiver based, in that the processing of the signal, to remove unwanted ISI and/or minimize error propagation, is located in the receiver. FIG. 8 is provided for the purpose of discussion and understanding, and as such, it does not illustrate every component of a communication system and in some instances certain elements may be generalized. It is contemplated, however, that one of ordinary skill in the art may enable such a system, based on the teaching of the Figures and text, without undue experimentation.

As shown, a symbol generator or symbol source 804 provides a signal to one or more channels 808. As such, the source 804 may comprise a transmitter and associated components or any other device or system configured to provide a signal to a receiver. The channel 808 connects to a filter 812 which in this embodiment is configured as a FFE filter F'(z). The output of the FFE filter 812 feeds into a junction 816, which also receives a first feedback signal from an FFE filter 820 and a second feedback signal from a DFE filter 824. The junction 816 may comprise a summing junction configured to subtract both the first and second feedback signals from the output of the FFE filter 812.

The output of the junction 816 connects to a decision device 828, such as a slicer, and to a junction 832. The decision device 828 operates as described above while the junction 832 is configured to generate a difference signal between the input to and the output from the decision device 828. The difference signal is presented to the FFE filter 820, which in this embodiment is configured with a transfer function of P(z)−1. The output of filter 820 comprises the first feedback signal.

The output of the decision device 828 also connects to the DFE filter 824, which is configured with a transfer function B(z)−1. The output of filter 824 comprises the second feedback signal. The output of summing junction 816 and/or the decision device 828 are also provided to subsequent processing elements such as, but not limited to, a decoding or demodulation module, and may ultimately be provided to the media access controller (MAC). It is contemplated that the structure shown provides desired filtering and signal processing to mitigate ISI, fascilitate clock recovery and minimize out of band noise.

It is contemplated that these filters 812, 820, 824 may comprise any type of filter or signal processing device configured to function as described herein. In one configuration, the filters comprise digital filters configured with one or more filter coefficients. The digital filters may comprise lattice, parallel or cascade elements, polyphase or any other type of filter or signal processing structure either as described herein or as may be contemplated by one of ordinary skill in the art. The claims that follow are not limited to the particular type of filter or processing structure selected to achieve the novel methods disclosed herein. Further, it is contemplated that the filters could be implemented in the analog domain.

Figure 11:
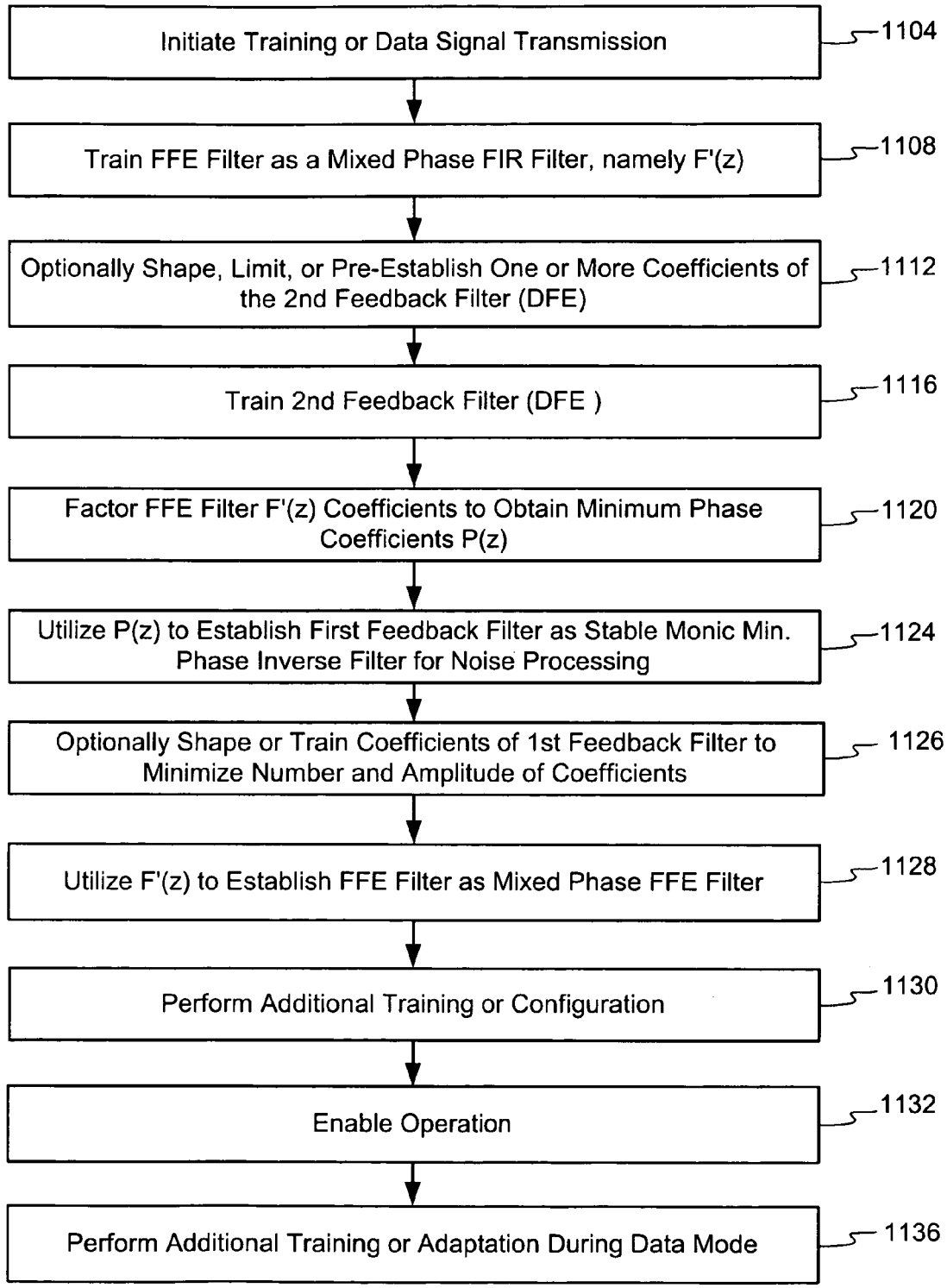
FIG. 11 illustrates an operational flow diagram of an example method of training or filter configuration.

With regard to establishment of the filter coefficients for filters 812, 820, 824, one example method of training or filter configuration is shown and described in connection with FIG. 11. This is but one example method of operation for filter configuration and, as such, it is contemplated that other methods or ways of configuring the elements may be possible. At a step 1104, a training signal or data signal may be sent, such as from the source 804 to the receiver system 800. Any type signal may be utilized. At a step 1108, the training operation trains the FFE filter (element 812 in FIG. 8) as a mixed phase FIR filter having a transfer function F'(z). This may occur using any training process.

At a step 1112, the operation optionally shapes, limits, or pre-establishes one or more coefficients of the second feedback filter, which in this embodiment is a DFE filter (element 824 in FIG. 8). In one embodiment, this may comprise establishing one or more of the coefficients at a zero value. In one embodiment, this may comprise establishing one or more of the coefficients at a pre-determined value other than zero or limiting the number or magnitude of one or more coefficients. It is contemplated that by optionally pre-establishing or limiting the value of one or more of the DFE coefficients, which is to say limiting or controlling the degree to which this filter modifies an input, error propagation may be minimized or reduced. At a step 1116, the operation trains the second feedback filter, in this embodiment the DFE filter 824, subject to the optional limitations of step 1112. Any type training processing may be used, as described herein or known by one of ordinary skill in the art.

At step 1120, the operation factors the coefficients of the FFE filter F'(z) to obtain minimum phase coefficients. These coefficients may be defined as having a transfer function P(z) when established in a filter. The factoring to isolate the minimum phase coefficients may occur by Newton's or the Laguerre method, or any other method, all of which may be performed in hardware, software, or both.

At step 1124, the system utilizes the minimum phase coefficients P(z) to establish the first feedback filter as a stable, monic minimum phase inverse filter. In one embodiment, this filter is configured to perform processing to reduce unwanted correlated noise or any other type of noise. In other embodiments, this filter may be configured to perform other or additional processing. It is contemplated that the transfer function for the first filter is established as a feedback filter with P(z)−1. Thereafter, at a step 1126, the operation optionally shapes or trains the coefficients of the first feedback filter to minimize the number and amplitude of the coefficients. This may optionally occur to minimize any error propagation or to reduce complexity of the receiving system.

At a step 1128, the operation utilizes the mixed phase coefficients to establish the FFE filter F'(z) as a mixed phase FFE filter. When configured in this manner, the FFE filter (element 812 in FIG. 8) is configured to eliminate pre-cursor ISI and compensate for the shaping of the DFE coefficients. In one embodiments, the FFE reduces non Gaussian and/or correlated noise. It is contemplated that at step 1130 additional training or filter configuration may occur. At step 1132, operation of the communication system may be enabled and may enter data mode. Data mode may comprise exchange of data, i.e., data received by the receiver and processed as discussed herein. It is further contemplated, that at a step 1136, additional training or adaptation may occur. The adaptation during data mode provides an advantage over precode systems by allowing for fine-tuning or adjustment of filter performance during data mode without need to transmit data to a precode filter on the far end side of the channel, or interruption of data mode to adapt a precode filter. This benefit may be very desirable when utilized in an environment where the amount of ISI, noise, crosstalk, or other factors may change during use, particularly, in response to temperature and other environmental conditions.

In operation, the system 800 of FIG. 8 receives a signal from the channel 808. The signal, after processing such as by an analog front end (not shown), is received by the filter 812. The filter 812 processes the signal to perform equalization on the received signal to compensate for the distorting effects of the channel. It is contemplated that the FFE filter 812 may possess coefficients, or other scaling values, associated with one or more taps or stages of the FFE. The coefficient values are selected to achieve desired signal equalization to thereby negate, reverse, or reduce the effects of the channel. In one embodiment, the FFE 812 coefficient values are selected based on the principles described herein. In one embodiment, the filter 812 is configured to eliminate pre-cursor ISI and compensate for the shaping of the DFE.

The output of the filter 812 is provided to the junction 816, which subtracts the first feedback signal, received from filter 820, and the second feedback signal, received from the filter 824. Subtracting these feedback signals results in the reduction of ISI and correlated noise. The output of the junction 816 feeds into a decision device 828, which operates as described above, and to a junction 832. The junction 832 generates a difference signal between the decision device input and output, which is provided to the filter 820. The decision device output is also provided to the DFE filter 824.

Operation of the filters 820, 824 is now discussed. In this embodiment, the filter 820 is configured with a transfer function defined by P(z)−1 to process the difference signal to remove noise from the received signal. The processing by the filter 820 removes the correlation induced on the noise by the mixed phase FFE filter which in turn is compensating for the shaping of the DFE.

The filter 824 is configured with a transfer function B(z)−1, wherein B(z) is the transfer function of the channel. In general, DFE 824 performs equalization on the received signal to compensate for the distorting effects of the channel. The DFE filter 824, as part of the feedback loop, receives and weights past values, which are subsequently subtracted, in the summing junction 816, from the FFE processed signal. It is contemplated that the DFE filter 824 may possess coefficients, or other scaling values, associated with one or more taps or stages of the DFE. The coefficient values are selected to achieve desired signal equalization to thereby negate, reverse, or reduce the effects of the channel. In one embodiment, the DFE 824 coefficient values are selected based on the principles described herein. In one embodiment, B(z) represents the transfer function of a minimum phase channel. In one embodiment, the DFE filter 824 is configured to eliminate the post cursor ISI created by the bandlimiting of the channel.

As an advantage of the method and apparatus described herein, the coefficient values of the FFE 812, DFE 824, are calculated and selected to counter the signal distorting effects of the channel while minimizing noise enhancement and undesirable error propagation.

Figure 9:
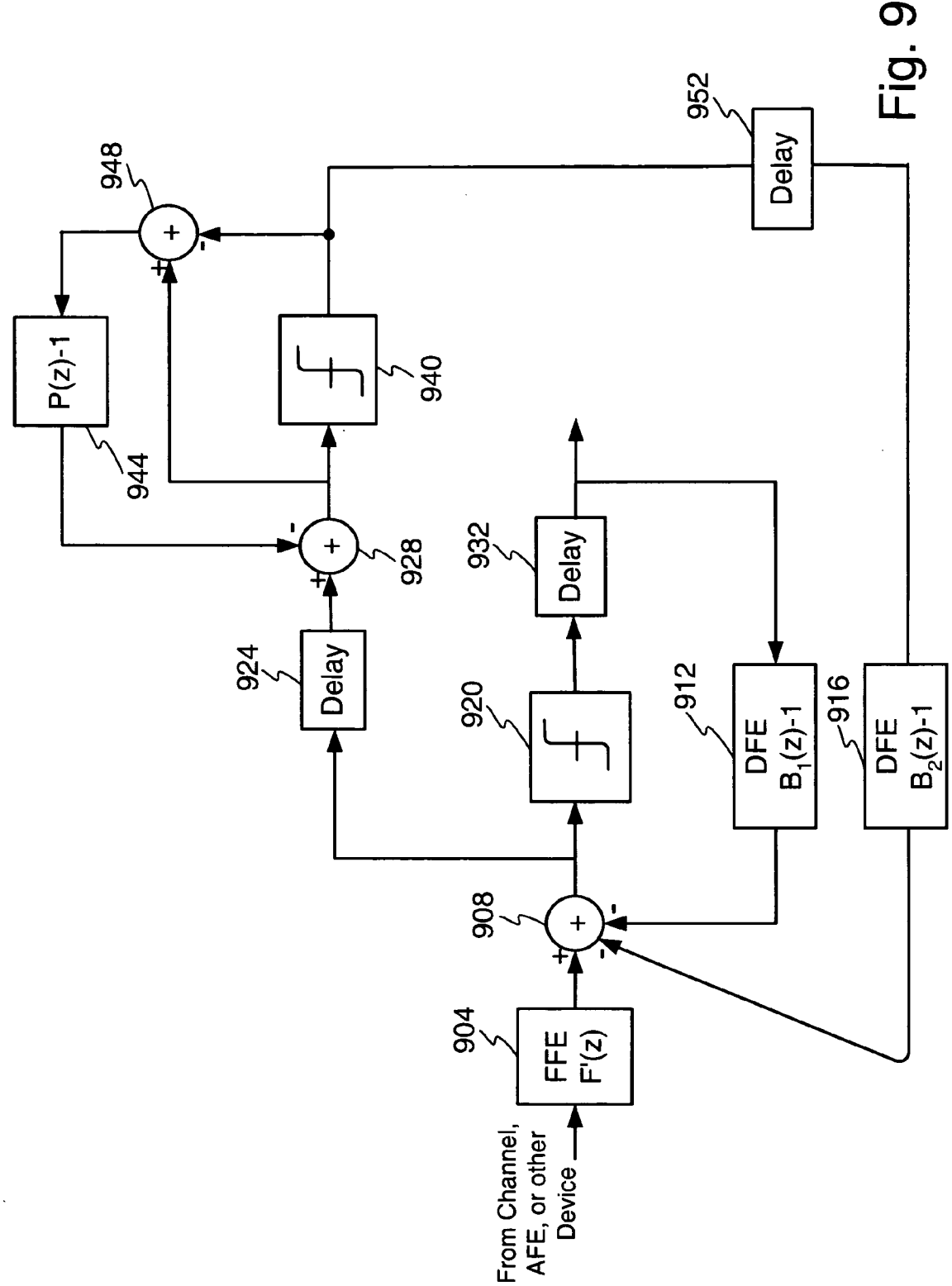
FIG. 9 illustrates a block diagram an alternative example embodiment of an apparatus for channel equalization with three filters located at the receiver.
Figure 10:
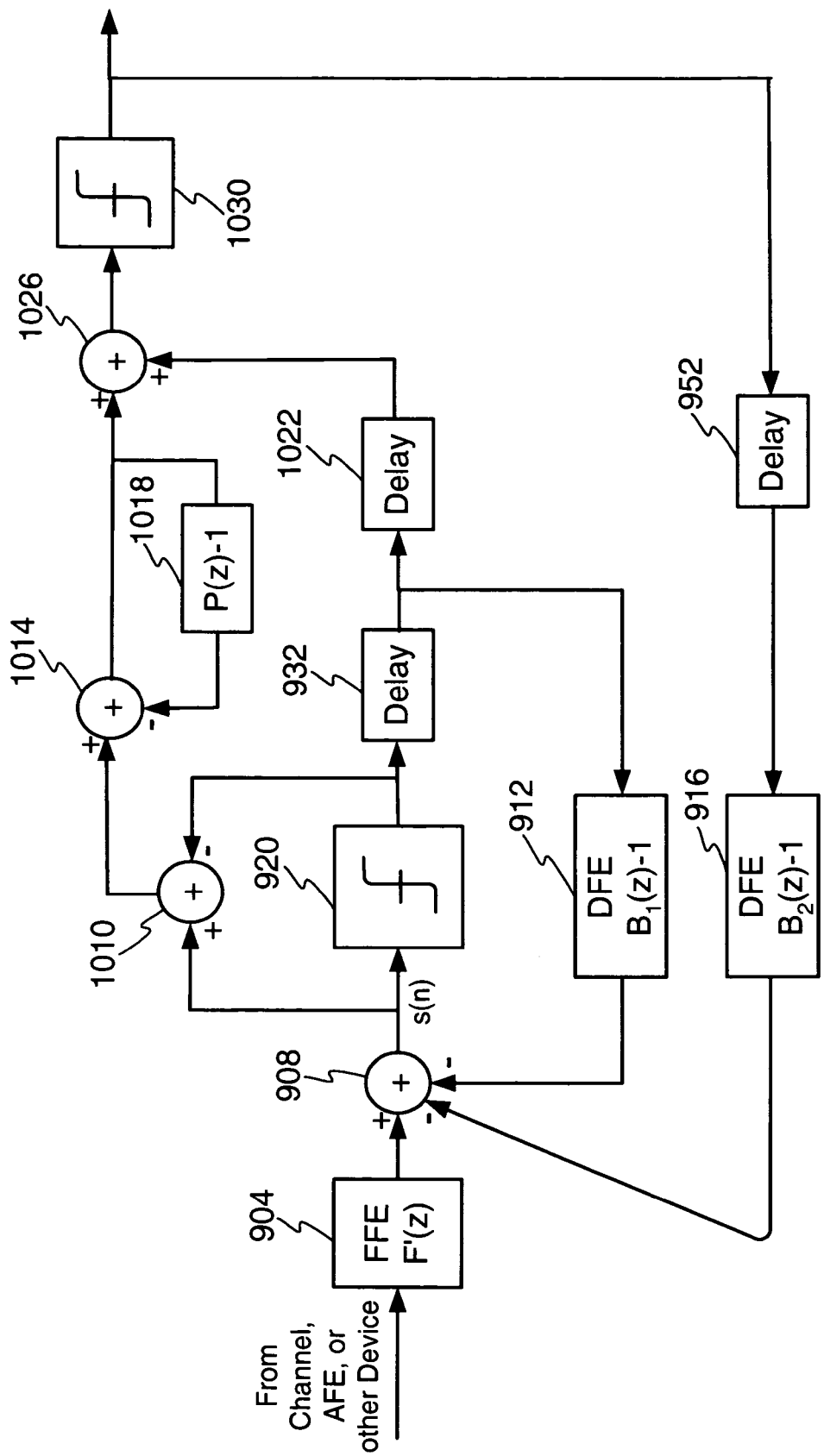
FIG. 10 illustrates a block diagram an alternative example embodiment of an apparatus for channel equalization with equalization filters located at the receiver.

There are numerous benefits of this configuration and the configurations shown in FIGS. 9 and 10. One such benefit is that, as compared to embodiments that utilize a precode filter located at a remote transmitter, the embodiments of FIGS. 8, 9, and 10 do not utilize precode processing. As a result, it is not necessary to establish a return communication path during training to send precoder coefficients to a remote transmitter. Moreover, the additional apparatus of a precode filter may be eliminated. Additionally and as discussed above, because the processing apparatus is located in the receiver, adaptation during data mode may be realized without use of a complex side channel, a data inserter, or ceasing data mode operations, to send updated precode coefficients.

A further benefit that arises from avoidance of the precode filter is a reduction in the PAR (peak to average ratio)

associated with the input signal to the analog front end (AFE) in the transmitter. Use of a linear precode filter places challenges on the specifications of the transmitter's analog front end due to the linear precode filter's tendency to increase PAR and to increase the high frequency portion of the signal spectrum. Signal amplification may be most prevalent in the high frequency portions of the signal, which in turn, undesirably increases the high frequency linearity requirements in the transmitter and may require additional resolution in digital to analog converters. Use of the receiver based filter structure described herein overcomes these drawbacks thereby reducing AFE complexity, increasing AFE performance, or both.

Yet another advantage to the embodiment described herein is its ability to tailor, adjust, or pre-set the DFE coefficients to thereby minimize or eliminate error propagation. As can be appreciated, error propagation may lead to catastrophic failure, which is highly undesirable. This is particularly true in systems employing forward error correction. By shaping the DFE filter, such as by presetting or limiting the size and/or number of taps, error propagation may be reduced or eliminated.

FIG. 9 illustrates an example embodiment of a block diagram of an alternative embodiment of the receiver based filter structure shown in FIG. 8. As compared to FIG. 8, some complexity simplifications, during actual implementation, may be realized. As shown, a filter 904 receives a signal, such as from, but not limited to, a channel or analog front end. The filter 904 is configured with a transfer function F'(z), which is discussed above. The output of the filter 904 feeds into a junction 908, which also receives a feedback signal from a filter 912 and a filter 916. Filters 912, 916 are discussed below in more detail.

The output of the junction 908 is provided to a decision device 920, in this embodiment a slicer, and to a delay 924. The decision device 920, which operates as described above, provides its output to a delay 932, which in turn has an output connected to the filter 912.

The output of filter 924 connects to a junction 928, which also receives a feedback signal from filter 944, which is configured with a transfer function of P(z)−1, which is described above. The junction 928 subtracts the feedback signal, from the filter 944, from the output of the delay 924. The output of the junction 928 connects to a decision device 940 and to a junction 948. The junction 948, which also receives the output of the decision device 940, creates a difference signal using the input and output of the decision device. The difference signal is provided to the filter 944, which processes the difference signal to create the feedback signal. In general, the processing of elements 928, 940, 948, and 944 is performing the same function as 816, 828, 820 and 832 of FIG. 8, but the processing is outside the critical circuit timing loop of the DFE thereby making for a simpler implementation. The drawback with this is that the decisions entering the filter 912 have a higher error rate and thus, are more prone to error propagation. The output from element 940 may be presented to subsequent downstream processing, such as, but not limited to, a decoding module, if the signal is encoded.

The output of the decision device 940 is also provided to a delay 952, which in turn has an output connected to the filter 916. The delays 924, 932, 952 may delay a signal any amount, such as, but not limited to, one or more clock cycles or other time frame, such as baud or symbol period. The delays maintain synchronization between signals and processing paths and account for delays introduced by other elements, such as the group delay of the filters.

The filters 912, 916 are configured as feedback filters with one or more aspects, parts, or characteristics of the channel transfer function, defined as B(Z). In general, the transfer function of filter 824 may be considered as being split between filters 912, 916. In this embodiment, the filter 912 is configured or trained with the transfer function $B_1(z)-1$ while the filter 916 is configured or trained with the transfer function $B_2(z)-1$. In general and as compared to the embodiment of FIG. 8, in FIG. 9 the combined processing performed by filters 912 and 916 perform a generally similar purpose as filter 824 in FIG. 8. In one embodiment, the filter 912 generates a larger feedback signal than filter 916.

In particular, the transfer function $B_1(z)-1$ is configured to eliminate the first number of post cursor ISI terms. The transfer function $B_2(z)-1$ is configured to eliminate the later post cursor ISI terms. Separating the processing into two or more separate processing element, namely 912, 916, enables the inverse filtering associated with P(z) to be out of and downstream of the critical feedback loop of the DFE. The down side to this approach is the portion of the DFE processing done in 912 is done with slicer decisions of a higher error rate which are more likely to cause error propagation. The slicer decisions entering 916 are of a comparable error rate as that of 824 in FIG. 8.

With regard to training and filter configuration, the transfer function notation and training pattern described above in connection with FIGS. 8 and 11 also applies to FIG. 9. As such, $B_1(z)$ and $B_2(z)$ are derived from the transfer function of the channel. P(z) is derived from or represents the minimum phase coefficients of F'(z) of the FFE filter. In one embodiment, P(z) represents a stable, monic minimum phase inverse filter. F'(z) is used to establish the FFE filter 904 as a mixed phase filter. This embodiment may also perform adaptation during data mode without use of a complex side channel to transmit information to a precode filter. The embodiment of FIG. 9 provides at least the same benefits as discussed above in connection with FIGS. 8 and 11.

Turning now to FIG. 10, an alternative embodiment of the structure of FIG. 9 is shown. As compared to FIG. 9, identical or similar elements shown in FIG. 10 are labeled with identical reference numbers. In addition to avoid repetition, only the aspects of FIG. 10, which differ from FIG. 9, are discussed in detail.

In the upper portions of FIG. 10, the output of the junction 908 and the output of the decision device 920 are provided to a junction 1010 to thereby generate a difference signal between the input and output from the decision device. This difference signal is output from the junction 1010 to a junction 1014, which subtracts a feedback signal from a filter 1018, which is configured as P(z)−1. The input to the filter 1018 is the output of the junction 1014 as shown. Derivation of the coefficients for the filter 1018 and P(z)−1 is described above. In one embodiment, filter 1018 is configured to mitigate, decorrelate and/or cancel noise.

The output of the junction 1014 also connects to junction 1026, which also receives the output from a delay 1022. The junction 1026 combines these two signals as shown, to create an output that is provided to a decision device 1030, which operates as described above. The output of the decision device 1030 comprises the output signal, which may be provided to subsequent processing and/or decoding. This signal is also fed back to delay 952 for use by the filter 916 to create a feedback signal.

Operation, training, adaptation, and the transfer functions for the filters of the embodiment of FIG. 10 are generally similar to the embodiment shown in FIG. 9 and as such, these aspects are not described again. Similarly, the benefits enjoyed by the embodiments of FIGS. 8, 9, and 11 are shared by the embodiment of FIG. 10.

In the embodiments shown in FIGS. 9 and 10, the inverse filtering associated with P(z) is done outside of and downstream of the critical feedback of the DFE. As a result, these embodiments enjoy certain reductions in complexity and the associated advantages, as compared to the embodiment of FIG. 8. In certain environments, however, the portion of the DFE designated $B_1(z)$ shown in FIGS. 9 and 10 may be more likely to error propagate as compared to the embodiment of FIG. 8. The essential difference between the embodiments shown in FIGS. 9 and 10 is that the inverse filtering of the embodiment shown in FIG. 10 has separated the processing on the signal from the processing of the error. The output of the two processes are, however, combined in the summing junction of 1026.

It is contemplated that the features and steps described herein may be configured alone or in any combination. It is also contemplated that the system described herein may be configured for use in a multi-channel environment, and as such, communication may be exchanged across channels. While various embodiments of the invention have been described, it will be apparent to those of ordinary skill in the art that many more embodiments and implementations are possible that are within the scope of this invention.

What is claimed is:

1. A system for channel equalization comprising:
   a first filter configured to utilize one or more first filter coefficients, the first filter comprising mixed phase filter and configured to output a first filter output;
   a second filter having one or more second filter coefficients based on the transfer function of the channel, the second filter configured to filter an error signal and output a filtered error signal; and
   a third filter comprising a feedback filter having one or more third filter coefficients, the third filter comprising a minimum phase filter and is configured to output a third filter output;
   a first junction configured to subtract the filtered error signal and the third filter output from the first filter output to create a decision device input;
   a decision device configured to receive the decision device input and create a decision device output; and
   a second junction configured to create the error signal based on the decision device input and the decision device output, wherein the first, second, and third filters are located in a receiver.

2. The system of claim 1, wherein one or more coefficients of the second filter are established at a predetermined value.

3. The system of claim 1, further including a processor configured to calculate the first filter coefficients, second filter coefficients and the third filter coefficients.

4. The system of claim 1, wherein the first filter comprises a feed forward filter and the second and third filter comprises a decision feedback filters.

5. The system of claim 1, wherein the error signal comprises the decision device input minus the decision device output.

6. The system of claim 5, wherein the second filter filters the error signal to remove correlation induced on noise by the first filter.

7. A method of equalizing a received signal comprising:
   receiving a signal;
   filtering the received signal with a feed forward filter, the first filter configured as a mixed phase filter, to create a filtered signal;
   subtracting a first feedback signal and a second feedback signal from the filtered signal to create a decision device input signal;
   performing a decision operation on the decision device input signal to create a output signal;
   creating a difference signal comprising the difference between the decision device input signal and the output signal;
   filtering the difference signal with a feedback filter configured as a minimum phase filter to create the first feedback signal; and
   filtering the output signal with a feedback filter configured with coefficients based on the transfer function of the channel to create the second feedback signal.

8. The method of claim 7, wherein the feedback filter configured as a minimum phase filter and the feedback filter configured with coefficients based on the transfer function of the channel both comprise decision feedback filters.

9. The method of claim 7, wherein the signal is received in an Ethernet communication device.

10. The method of claim 7, wherein the feedback filter configured as a minimum phase filter comprises a stable monic minimum phase inverse filter for noise processing.

11. The method of claim 7, wherein the filters comprise analog filters.

12. The method of claim 7, wherein one or more of the coefficients of the feedback filter having coefficients based on the transfer function of the channel are established at zero value to reduce error propagation.

13. The method of claim 7, wherein the method of equalizing does not utilized precoding.

14. A receiver configured to process a received signal comprising;
   at least one analog front end configured to receive an incoming signal and convert the incoming signal to a digital format;
   at least one feedforward filter configured as a mixed phase filter to filter the incoming signal in a digital format to create a filtered signal;
   at least one junction configured to combine the filtered signal with two or more feedback cancellation signals to create a junction output;
   two or more filters configured to generate the two or more feedback cancellation;
   signals, wherein one of the two or more filters is a minimum phase filter and the other is based on the transfer function of the channel;
   a decision device configured to receive a decision device input and perform a decision operation to create an decision device output;
   wherein at least one of the two or more filters receives and filters a difference signal comprising the difference between the decision device input and the decision device output.

15. The receiver of claim 14, wherein the junction subtracts two or more feedback cancellation signals from the processed signal.

16. The receiver of claim 14, wherein the receiver is further configured to dynamically adapt to changes in the transfer function of the channel.

17. The receiver of claim 14, wherein the two or more filters comprise feedback filters and wherein the at least one of the two or more filters that receives and filters the difference signal is configured to filter the difference signal to remove correlation induced on noise by the at least one feedforward filter.

18. The receiver of claim 14, further comprising:
a junction configured to generate the difference signal, wherein at least one of the two or more filters is configured with coefficients based on the transfer function of the channel and wherein at least one of the two or more filters comprises a minimum phase filter.

19. The receiver of claim 18, wherein the at least one filter comprising a minimum phase filter comprises a monic minimum phase inverse filter for noise processing.

20. The receiver of claim 14, wherein at least one coefficient of the two or more filters is fixed at a zero value to reduce error propagation.

* * * * *